United States Patent
Thyagarajan

(10) Patent No.: US 11,467,881 B2
(45) Date of Patent: Oct. 11, 2022

(54) FRAMEWORK, METHOD AND APPARATUS FOR NETWORK FUNCTION AS A SERVICE FOR HOSTED NETWORK FUNCTIONS IN A CLOUD ENVIRONMENT

(71) Applicant: AT&T Intellectual Property I, L.P., Atlanta, GA (US)

(72) Inventor: Manikka Thyagarajan, Short Hills, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 320 days.

(21) Appl. No.: 15/703,371

(22) Filed: Sep. 13, 2017

(65) Prior Publication Data
US 2019/0079804 A1 Mar. 14, 2019

(51) Int. Cl.
*G06F 15/173* (2006.01)
*G06F 9/50* (2006.01)
*H04L 41/50* (2022.01)
*G06F 9/455* (2018.01)
*H04L 67/1036* (2022.01)
*H04L 41/0896* (2022.01)
*H04L 41/5051* (2022.01)
*H04L 67/62* (2022.01)
*H04L 67/1014* (2022.01)
*H04L 41/08* (2022.01)

(52) U.S. Cl.
CPC ........ *G06F 9/5077* (2013.01); *G06F 9/45533* (2013.01); *G06F 9/5038* (2013.01); *H04L 41/0896* (2013.01); *H04L 41/50* (2013.01); *H04L 41/5051* (2013.01); *H04L 67/1036* (2013.01); *H04L 67/62* (2022.05); *G06F 2009/4557* (2013.01); *H04L 41/08* (2013.01); *H04L 67/1014* (2013.01)

(58) Field of Classification Search
CPC ..................................................... G06F 9/5077
See application file for complete search history.

(56) References Cited

U.S. PATENT DOCUMENTS

| | | | |
|---|---|---|---|
| 9,979,602 B1 * | 5/2018 | Chinnakannan | H04L 47/82 |
| 2013/0007737 A1 * | 1/2013 | Oh | G06F 9/452 |
| | | | 718/1 |
| 2013/0304880 A1 * | 11/2013 | Lin | H04L 41/0803 |
| | | | 726/4 |
| 2014/0229945 A1 * | 8/2014 | Barkai | H04L 49/70 |
| | | | 718/1 |

(Continued)

*Primary Examiner* — Razu A Miah
(74) *Attorney, Agent, or Firm* — Guntin & Gust, PLC; Douglas Schnabel

(57) ABSTRACT

A system for providing network function as a service includes a combination of virtual network resources hosted on physical network resources, wherein the virtual network resources are communicatively chained to provide a dynamically configurable set of processing resources and a configurable controller in communication with the combination of virtual network resources, wherein the controller includes a scheduler and load balancer. The controller is configured to receive a request to provide network function as a service functionality, retrieve policies associated with the request, schedule the virtual network resources to be assigned in response to the request, instantiate the virtual network resources and balance the virtual network resources across one or more physical resources.

20 Claims, 21 Drawing Sheets

(56) References Cited

U.S. PATENT DOCUMENTS

| | | | |
|---|---|---|---|
| 2016/0266938 A1* | 9/2016 | Suzuki | G06F 9/54 |
| 2017/0104609 A1* | 4/2017 | McNamee | H04L 63/06 |
| 2017/0192806 A1* | 7/2017 | Koat | H04L 67/10 |
| 2018/0006928 A1* | 1/2018 | Luo | H04L 45/121 |
| 2019/0028350 A1* | 1/2019 | Yeung | H04L 43/0817 |

* cited by examiner

FRAMEWORK, METHOD AND APPARATUS FOR NETWORK FUNCTION AS A SERVICE FOR HOSTED NETWORK FUNCTIONS IN A CLOUD ENVIRONMENT

TECHNICAL FIELD

This disclosure relates generally to network functionality and more specifically, to a system and method to provide a network operator the capability of adding any third party virtual machine into a carrier network.

BACKGROUND

Communication networks have migrated from using specialized networking equipment executing on dedicated hardware, like routers, firewalls, and gateways, to software defined networks (SDNs) executing as virtualized network functions (VNF) in a cloud infrastructure. To provide a service, a set of VNFs may be instantiated on the general purpose hardware. Each VNF may require one or more virtual machines (VMs) to be instantiated. In turn, VMs may require various resources, such as memory, virtual computer processing units (vCPUs), and network interfaces or network interface cards (NICs).

Converting a specialized network topology to a SDN-based network topology provides certain advantages. However, such a conversion also presents certain challenges. For example, many times a service provider may want to make the network available to third party suppliers or vendors to provide special purpose or additional products or services to customers. Vendor's network functions operating in a cloud environment may not meet the reliability typically found in a telecommunications carrier system. Such telecommunications systems typically target a reliability percentage of 99.999%, i.e., about 5.26 minutes of outage per year while certain vendor's network functions operating in a cloud environment may only achieve 99.9% availability, i.e., about 8.76 hours of outage per year which could make for a less than desirable customer experience. Hardware solutions to achieve the target availability may add significantly to capital expenditures and operational costs. Additionally, in an SDN environment, the vendor functionality supplier equipment may not have the flexibility and elasticity present in the native network to seamlessly accommodate various levels of usage. Finally, different vendors providing different solutions to the same cloud management requirements may add significantly to operational costs. For example, ten vendors providing ten different solutions to the same cloud problem may increase operating costs by a factor of ten.

Accordingly, there is a need to make available to third party suppliers network functions native on a cloud having telecommunications service provider quality and availability. Similarly, there is a need for a system and method to be able to integrate third party supplier network functionality to use the SDN-based network effectively to take advantage of the elasticity, self-healing, & other capabilities of cloud computing in an SDN environment.

SUMMARY

The present disclosure is directed to a system for providing network function as a service, including a combination of virtual network resources hosted on physical network resources, wherein the virtual network resources are communicatively chained to provide a dynamically configurable set of processing resources, and a configurable controller in communication with the combination of virtual network resources, wherein the controller includes a scheduler and load balancer and wherein the controller has a processor and memory and memory comprising executable instructions, wherein the executable instructions cause the processor to effectuate operations, the operations including receiving a request to provide network function as a service functionality, retrieving policies associated with the request, scheduling the virtual network resources to be assigned in response to the request, instantiating the virtual network resources, and balancing the virtual network resources across one or more physical resources. The virtual network resources may include a first virtual function and a second virtual function and wherein the operations further include monitoring the first virtual function and the second virtual function and adjusting a load balance based on the monitoring step. The first virtual function may be configured to communicate with a first plurality of mobile devices wherein the first plurality of mobile devices are configured to a first fully qualified domain name or configured to a first fixed Internet Protocol (IP) address and the second virtual function may be configured to communicate with a second plurality of mobile devices wherein the second plurality of mobile devices are configured to a second fully qualified domain name or configured to a second fixed IP address. to provide load balancing among the virtual network resources. The fixed IP address may be associated with a physical resource or a virtual resource.

In an aspect, the system may further include a third virtual function and wherein the scheduler dynamically assigns the first virtual function, the second virtual function and the third virtual function to a plurality of physical network resources using a weighted round robin method. In an aspect, one of the plurality of physical network resources may be taken off line and the first virtual function, the second virtual function and the third virtual network function are dynamically reassigned by the load balancer to physical network resources that are remaining on line. In an aspect, one of the plurality of physical network resources may experience a higher load independent of the request and the load balancer re-assigns a virtual function assigned to the one of the plurality of physical network resources is to a different physical network resources. The system may also include wherein a second request for network function as a service functionality is received and the scheduler and the balancer dynamically assign a second set of virtual network resources to the physical network resources to support the second request in accordance with the policies and wherein the first and second request are among a plurality of requests and the plurality of requests are dynamically accommodated on demand and supported on a per-use model.

The disclosure is also directed to a method including establishing multi-level policies for providing network functions as a service, receiving a request to provide network functions as a service, determining an initial set of resources to satisfy the request, determining an initial load balance among the initial set of resources in accordance with the policies, assigning a first virtual function to a first set of the initial set of resources, instantiating the first virtual function, assigning a second virtual function to a second set of the initial set of resources; instantiating the second virtual function, monitoring the first virtual function and the second virtual function and dynamically adjusting the initial load balance based on the monitoring step. The policies may be determined at the virtual function the network function, the site or the service level to support network function as a service requests. The policies may include allocation and load balancing that include redundancy of virtual functions on one physical set of resources or spread across multiple sets of physical resources. The policies may further include assigning virtual functions to physical resources based on geo-proximity or weighted round robin assignments. In an aspect, the weights used in the weighted round robin assignments are dynamically changed to create a second set of weights based on the monitoring step and the adjusting step is based on the second set of weights.

In an aspect, a second request to provide network function as a service is received and a second set of virtual resources are identified to support the second request and wherein the initial load balance is dynamically adjusted to accommodate the second set of virtual resources. The load balance may be determined based on the policies. The first set of virtual resources may be in communication with a plurality of mobile devices configured to a similar fully qualified domain name or to a fixed internet protocol address.

BRIEF DESCRIPTION OF THE DRAWINGS

In the following description, for purposes of explanation, numerous specific details are set forth in order to provide an understanding of the variations in implementing the disclosed technology. However, the instant disclosure may take many different forms and should not be construed as limited to the examples set forth herein. Where practical, like numbers refer to like elements throughout.

DETAILED DESCRIPTION

Overview

This disclosure is directed to Network Function as a Service (NFaaS) framework to provide the capability of adding third party virtual machines (VMs) to a cloud environment. Such a framework may improve network function availability, reduce capital and operational costs, and take full advantage of native cloud capabilities such as elasticity, flexibility and self-diagnosis and recovery.

The disclosure provides optimization of network resource allocations by considering network, hardware, administration and computing resources as a unified whole. This includes the automated provisioning of network functions (NFs) via orchestrated management of network resources and provides NF resource optimization and elasticity.

The disclosure includes a cloud-based managed network service that provides dynamically adaptable network function services virtually in a multi-tenant model which may, for example, be a pay-per-use model. NF services may be provided via hosted or on-premise environments or through the cloud, permitting NF performance optimization and resources for third-party NF development.

There are multiple layers that may be employed to provide services to customers in a pay-as-you go or subscription NFaaS environment. At the virtual machine (VM) layer, the services may include migration and load balancing wherein resource utilization and traffic monitoring may be performed. At the virtual function (VF) level, the services may include local or geo-redundancy, migration and life cycle management wherein the VF level provides monitors for session internet protocol (SIP), RTP and other telecommunications protocols. At the NF level, the services may include geo-redundancy, capacity grown and flexibility, and load balancing. All these may be implemented at a site level, either locally at the customer premise or hosted by a systems provider. Physical sites would be monitored for maintenance, loading, faults and the like. Alternatively, the NFaaS may be hosted in a cloud environment with the NFaaS monitoring the deployment, loading and use of cloud based resources.

NFaaS may have multiple use cases which will be described in more detail below. At a high level, exemplary use cases may include providing elasticity with scale-in and scale-out capability to accommodate changing loads and traffic pattern, which includes the capability to dynamically vacate a site for maintenance and/or add and remove sites from the resource pool. NFaaS may also have self-healing functionality to bypass network or site outages. The ability to dynamically add customer's access networks (ANs) may be provided and may include a single point of access for the ANs. Additionally, NFaaS may accommodate third party virtual functions that can run in a cloud environment. Policies may be defined which support each of those use cases to provide telco grade reliability and availability.

System Environment

Figure 1:
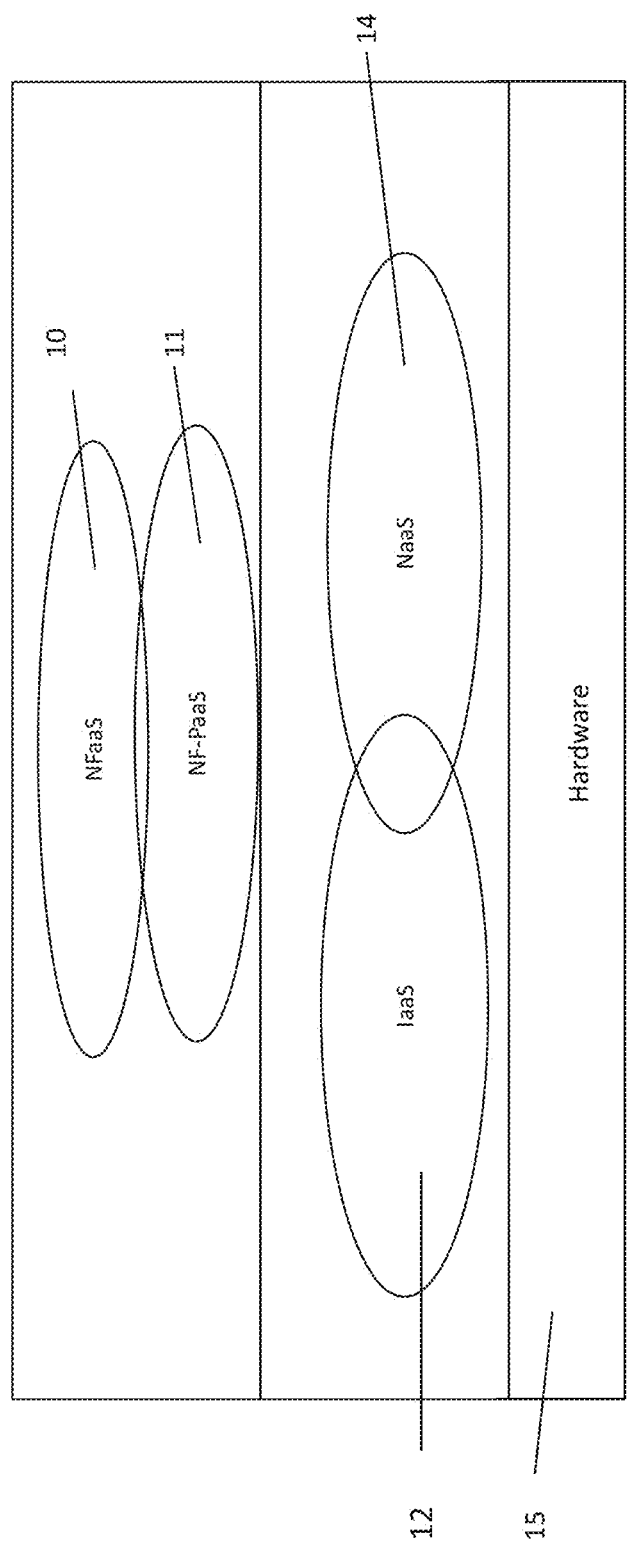
FIG. 1 is a representation of an exemplary topology for virtual network.

With reference to FIG. 1, there is shown an exemplary cloud-based network topology. On the bottom layer of the topology, there is the hardware 15 that supports the SDN network functionality. There is shown Infrastructure as a Service (IasS) 12, a form of cloud computing that provides virtualized computing resources over the Internet. In an exemplary IaaS model, a telecommunications service provider may host and/or operate hardware, software, servers, storage and other infrastructure components on behalf of its vendors, including hosting and managing vendors' applications and handle tasks including system maintenance, backup and resiliency planning. IaaS platforms offer highly scalable resources that can be adjusted on-demand. This makes IaaS well-suited for workloads that are temporary, experimental or that may change unexpectedly or change over time.

Also shown is Network as a Service (NaaS) 14. NaaS may, for example, include the provision of a virtual network service by the telecommunications service provider to vendors, including network virtualization. This permits vendors to operate as a service provider to its customers without the capital and operational expense of building and managing its own networks. It will be noted that there may be some overlap between NaaS 14 functionality and IaaS 12 functionality, depicted in FIG. 1 as an intersection between the two services.

Above that layer is shown Network Function as a Service (NFaaS) 10 supported by Network Function-Platform as a Service (NF-PaaS) 11. Such services, described in more detail below, may also be supplied to third party vendors by a telecommunications service provider to provide network function virtualization in a cloud environment.

IaaS 12 may include, for example, network components that provide storage functionality such as Amazon Web Services-S3 (AWS-S3), computing functionality such as Amazon Elastic Compute Cloud (EC2), Identity and Access Management (IAM), and the like. IaaS 12 may also include components that provide open stack functionality, including, for example, block storage functionality such as Cinder, cloud computing infrastructure functionality such as Nova, user interface dashboards such as Horizon, object storage functionality such as Swift, and other open stack functionality.

NaaS 14 may include, for example, components that provide functionality for Juniper Contrail and other Open Stack functionality such as application programming interfaces including Neutron, AWS VPC, and the like.

NFPaaS 11 may include components that provide Data Base as a Service (DBaaS), Load Balancing as a Service (LBaaS), DNS as a Service (DNSaaS), Network Time Protocol as a Service (NTPaaS), port monitoring as a service such as TAPaaS, network analytics and tools, and other types of functionality.

NFaaS 10 may include functional components for signaling, media, session control, identity, federation, access, etc.

The topology shown in FIG. 1 may work with any software defined network which may include the previously defined layers IaaS 12, NaaS 14 and NFaaS 10 and NF-PaaS 11.

Figure 2:
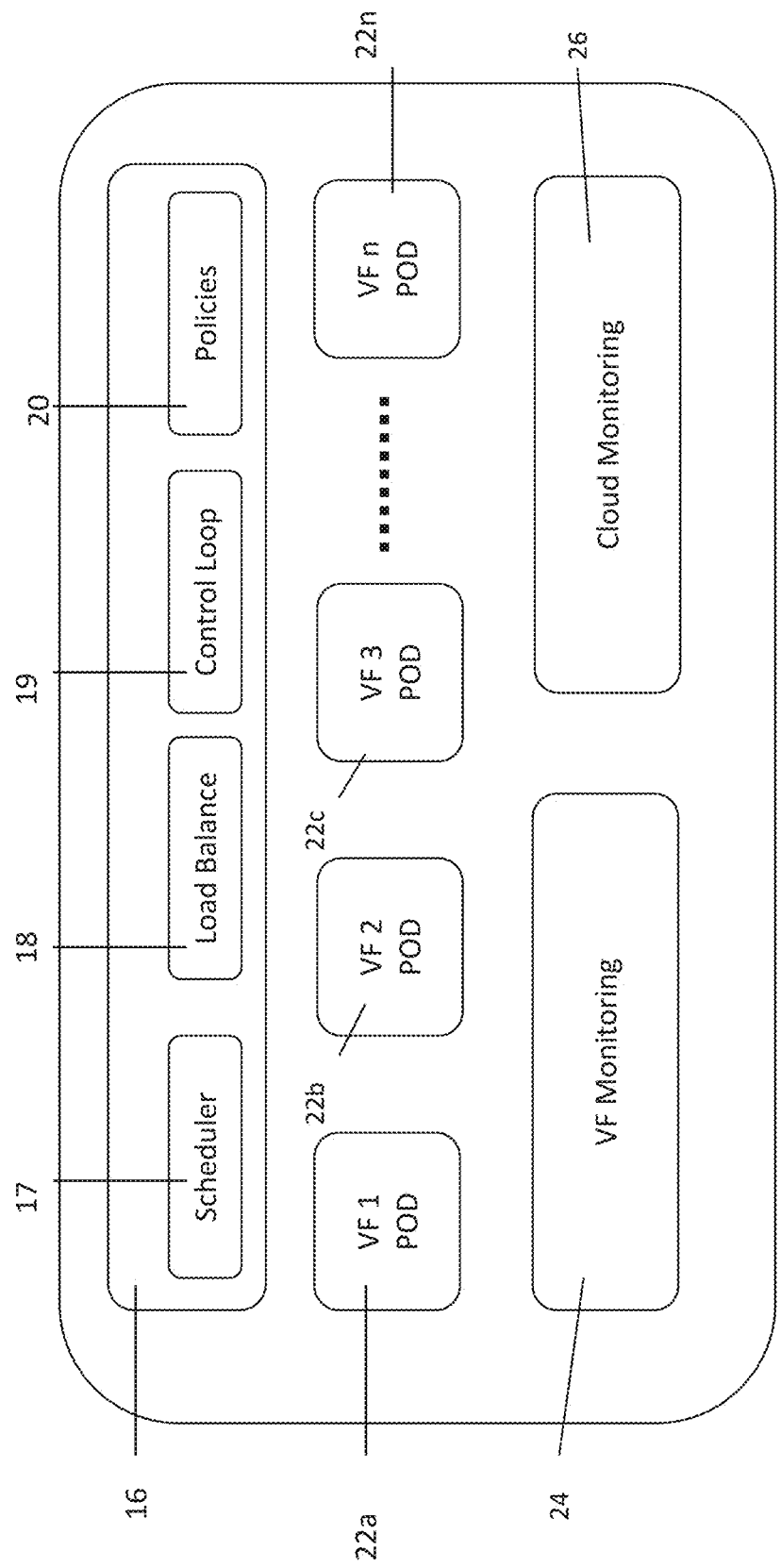
FIG. 2 is a graphical representation of an exemplary framework for Network Function as Service.

With respect to FIG. 2, there is shown an exemplary framework for implementing NFaaS. A NFaaS control bar 16 is shown. The control bar 16 may contain a scheduler 17 which may, for example control the number of instantiations of a particular network function. Thus, if the need for the number of instances of a network function change due to loading or other factors, instances of the network function may be created or removed to provide more or less capacity for that network function. There is also shown a load balancer 18 as part of the control bar 16. The load balancer 18 may perform round robin allocation tasks whereby certain network functions are distributed in an even, cyclical process to maintain equal loads across network functions. In an aspect, the load balancer 18 may perform weighted round robin allocations of network functions to favor distribution of the processing load to a particular resource or resources. The load balancer 18 may also perform health monitoring based, loading based, or other active/active or active/passive based redundancy (1+1 or N+K or cluster or other) capabilities.

The control bar 16 may also contain a control loop 19. The control loop 19 may be engaged to take recovery actions if a particular device fails or is taken offline. The control loop may be opened or closed control loops which are useful to detect abnormalities and take recovery actions. Also shown in the control bar 16 is a policy control function 20. The policy control define policies at the VF, NF, site, service, & other levels to enforce NFaaS.

Continuing with the description of FIG. 2, there are shown pods 22a, 22b, 22c, 22n. In any given configuration, there may be between 1 an n pods. Pods may serve as VF level units for scheduling, deployment, horizontal scaling, replication for capacity or redundancy, utilization of cloud resources such as vCPUs, memory, IP address and other cloud resources. There is also shown the VF monitoring function 24. VF monitoring may monitor the health of VF, including for example, VF, SIP, Diameter, RTP and the like. Finally, cloud monitoring functionality 26 may also be included. The cloud monitoring functionality 26 may monitor functions in the cloud, including VMs, servers, networking, IP addresses and the like.

Figure 3:
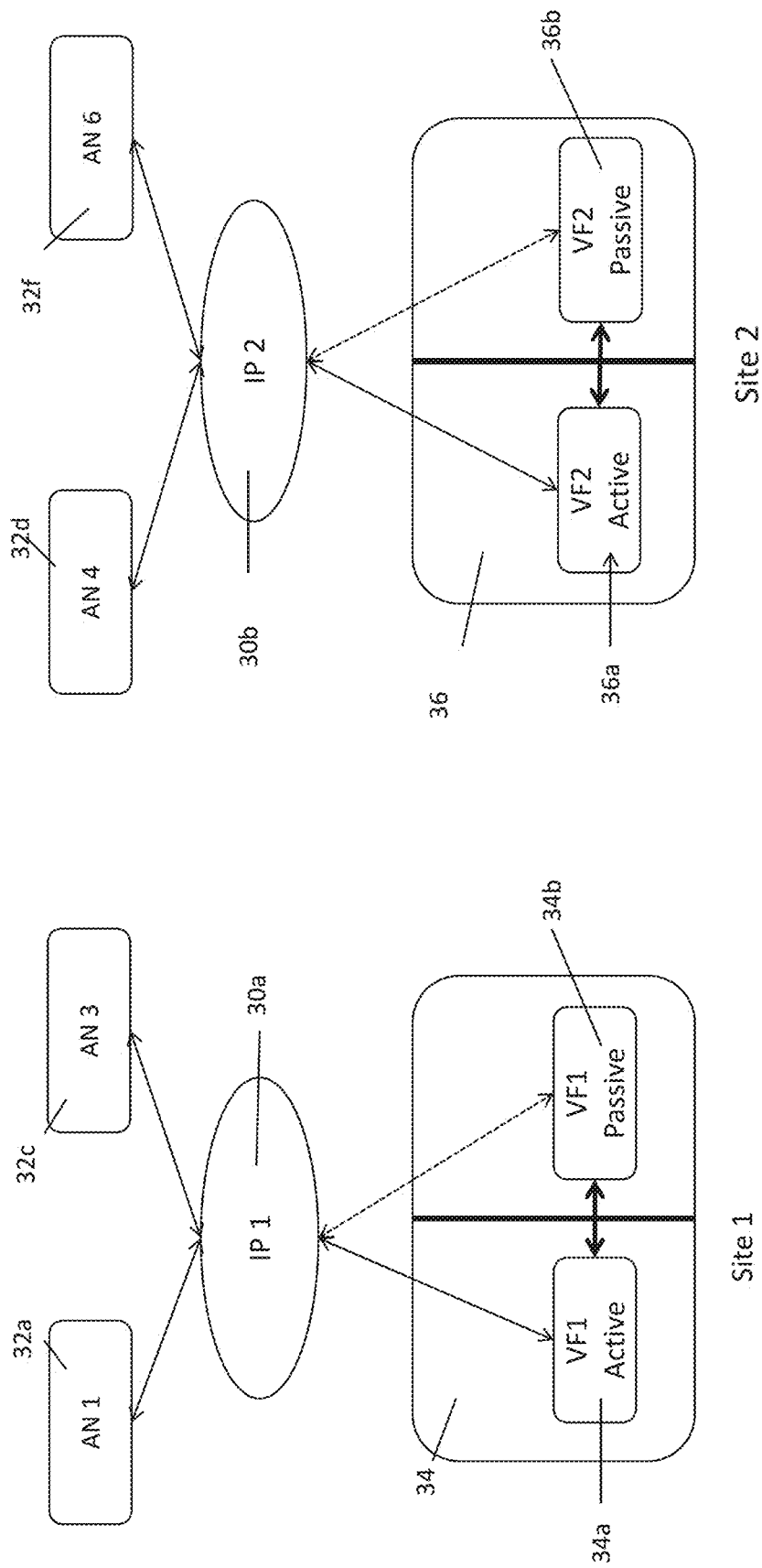
FIG. 3 is a representation of an exemplary framework that does not include a Network Function as a Service framework.

FIG. 3 shows a software defined network wherein network function as a service is not provided. Access networks AN1 32a and AN3 32c are shown in communication with IP 1 network 30a. IP1 network 30a then may instantiate virtual functions at site 1 34, including VF1 34a that is active and VF1 34b which provides passive redundant functionality. A similar configuration with respect to access networks AN4 32d and AN6 32f is using IP 2 network 30b is also shown.

Figure 4:
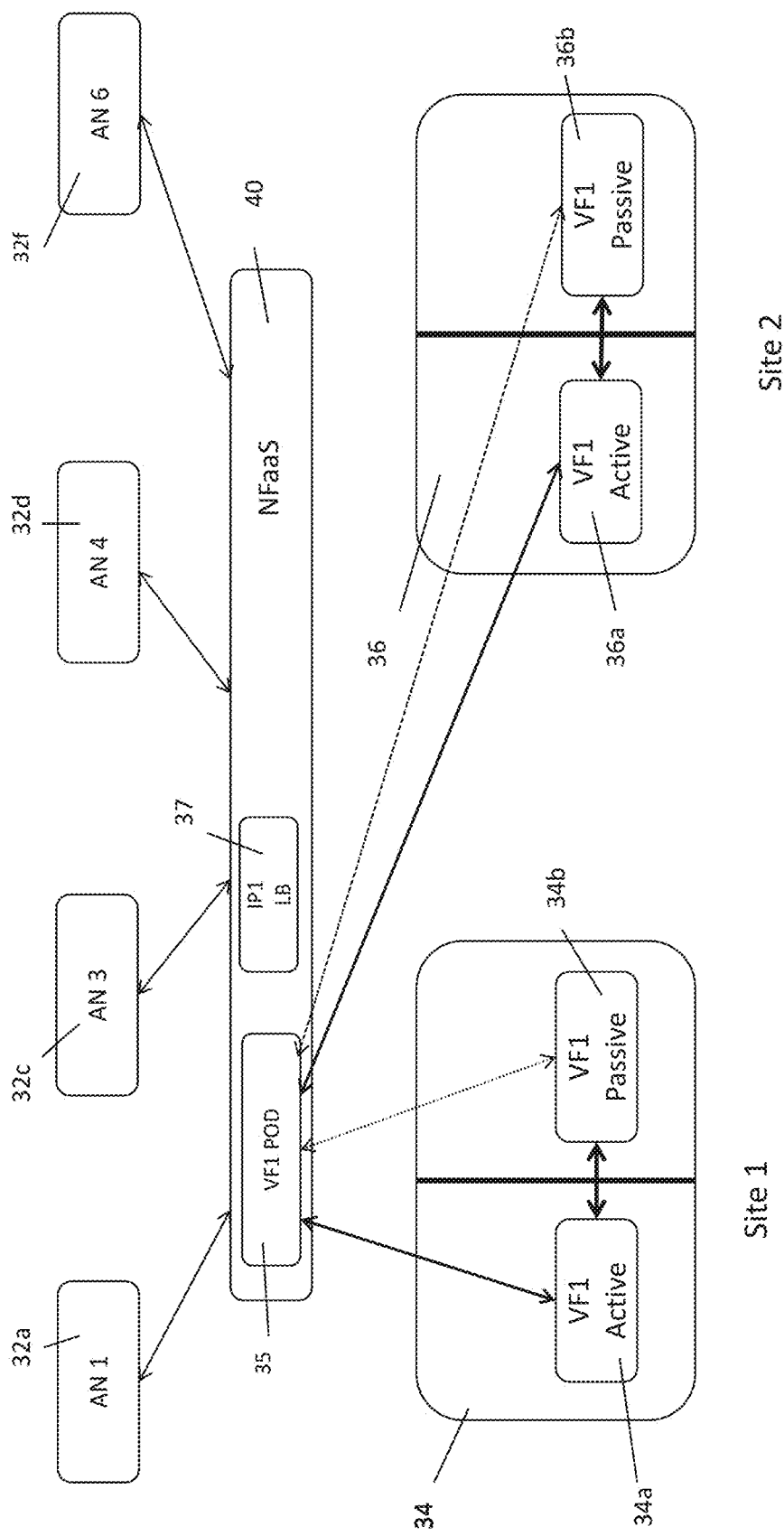
FIG. 4 is a representation of an exemplary framework that does include a Network Function as a Service framework.

With reference to FIG. 4, access networks AN1 32a, AN3 32c, AN4 32d and AN6 32f are shown using NFaaS wherein only IP network 1 is used. Each of the access networks AN1 32a, AN3 32c, AN4 32d and AN6 32f interface the NFaaS 40 functionality which may include VF1 Pod 35. Pods may serve as the network function/virtual function level units for scheduling, deployment, horizontal scaling, replication for redundancy, utilization of cloud resources such as virtual CPUs, cloud-based memory, and IP addressed for each of those access networks. The load balancing function 37 for IP1 may initially perform round robin or weighted round robin allocations among various VFs and sites. The load balancing function 37 may also receive feedback based on site health and maintenance, loading, active and/or passive redundancy requirements, and any other feedback designated by the policies and balance the load across VFs and sites.

The VF1 POD 35 may then allocate resources based on the policies to Site 1 34 and Site 2 36. In the exemplary configuration shown in FIG. 4, functionality requested by access network 1 32a and access network 3 32c may be virtually connected to site 1 34 which may be configured to have an active processing VF shown as VF1 active 34a and a redundant passive VF shown as VF1 passive 34b. VF1 passive 34b becomes a "hot spare" which can then be used in the event of a failure or planned maintenance shutdown. In a similar fashion, functionality requested by access network 4 32*d* and access network 6 32*c* may be virtually connected to site 2 36 which may be configured to have an active processing VF shown as VF1 active 36*a* and a redundant passive VF shown as VF1 passive 36*b*. VF1 passive 36*b* becomes a "hot spare" which can then be used in the event of a failure or planned maintenance shutdown.

Figure 5:
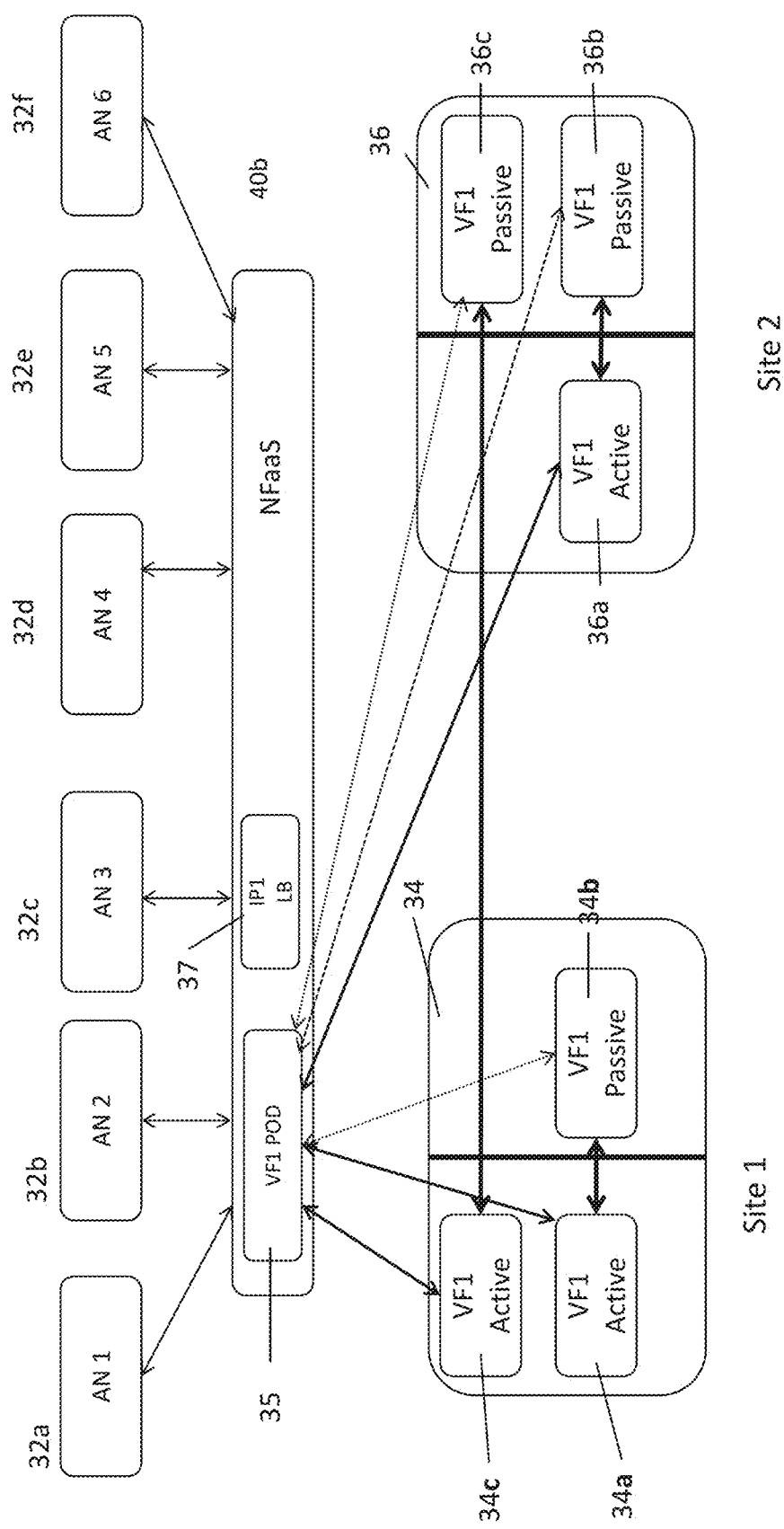
FIG. 5 is an alternative embodiment of the framework in FIG. 4.

The elasticity and scalability of NFaaS is illustrated in FIG. 5. When two additional customers or customer applications are added, shown as access network 2 32*b* and access network 5 32*e*, the load balancing function 37 informs the VF1 POD 35 as to the allocation of virtual resources across site 1 34 and site 2 36. In this example, another set of VFs are instantiated, shown as VF1 active 34*c* in site 1 34 and a hot spare redundant set of VFs instantiated shown as VF1 passive 36*c* at site 2 36. This illustrates the flexibility provided in allocation and load balancing in that the redundancy of virtual functions can be co-located at a site or spread across two or more sites, depending on the application and the requirements as set forth in the policy control.

In the above examples of FIGS. 3-5, the sites may be core networks in a cloud environment that are controlled by a service provider and used by the service provider to provide network services to customers or other third parties. The configuration permits a plug and play scenario in which additional customers or customer applications may be dynamically added or removed with the virtual resources allocated on an "as needed" basis.

Use Cases

By way of example only, multiple use cases are presented in accordance with the present disclosure to illustrate the various systems and methods wherein NFaaS may be implemented in a provider network. In the use cases, The NF-LBaaS component may manage at the DNS access level and may include general purpose load balancing with configurable logic based on the policies. There may be an intelligent DNS component which provides API access to update the resource requirements in real time based on policy enforcement. There may also be a VF-LBaaS component which manages the load balancing at the service provider level, which may, for example, be session internet protocol (SIP). This provides protocol awareness on the traffic paths to support required terminations and pass through of parameters as required.

In the following examples shown in FIGS. 6-8, the sites depict 3 possible VF configurations. Site 1 may have VFs with external load balancing functions of LBaaS, either virtual or perhaps physical. Site 2 may include VFs that do not require load balancing. Site 3 may include VFs that have built in load balancing functionality.

Figure 6:
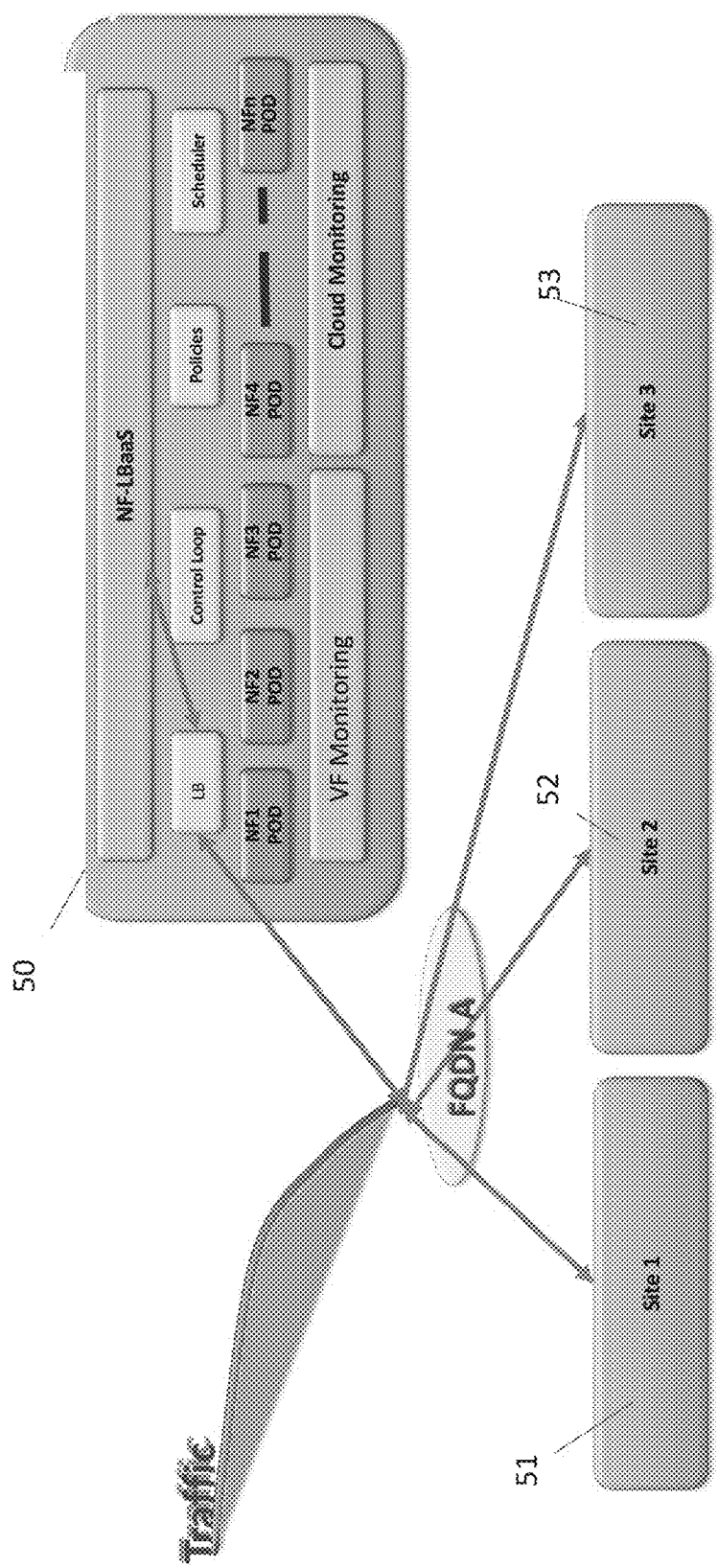
FIG. 6 is a representation of a use case in which the load balancing functionality of Network Function as a Service is shown.

With reference to FIG. 6, there is shown an exemplary configuration wherein the NFaaS 50 provides traffic management across multiple sites. NFaaS 50 is shown with the same components and functionality described above with reference to FIG. 2. The policy control module 20 may set policies for the provision of NFaaS 50. For example, the policies may include features such as geo-proximity among sites, weighted round robin assignments which may include equal weighting or weighting based on preferences set up and reflected in the policies. The policies may also include that the load may be adjusted based on feedback during the operation of the network functions. Other policies may also be included in the policy control module 20.

FIG. 6 shows how traffic may be routed from multiple mobile devices may be routed to one of three physical sites, site 1 51, site 2 52, and site 3 53 wherein all of such mobile devices are configured to the same fully qualified domain name (FQDN). The weighted round robin may instantiate the first VFs at site 2 52, then followed by site 3 53 and site 1 53. Using geo-proximity, the VFs may be output to site 2 52 and site 3 53. Using load (SIP) feedback, the VF output may also be to site 3 53. This use of NFaaS permits the dynamic load balancing using network function-load balancing as a service (NF-LBaaS) and iDNS. NFaaS 50 is also able to dynamically changes traffic management logic in this use case.

Figure 7:
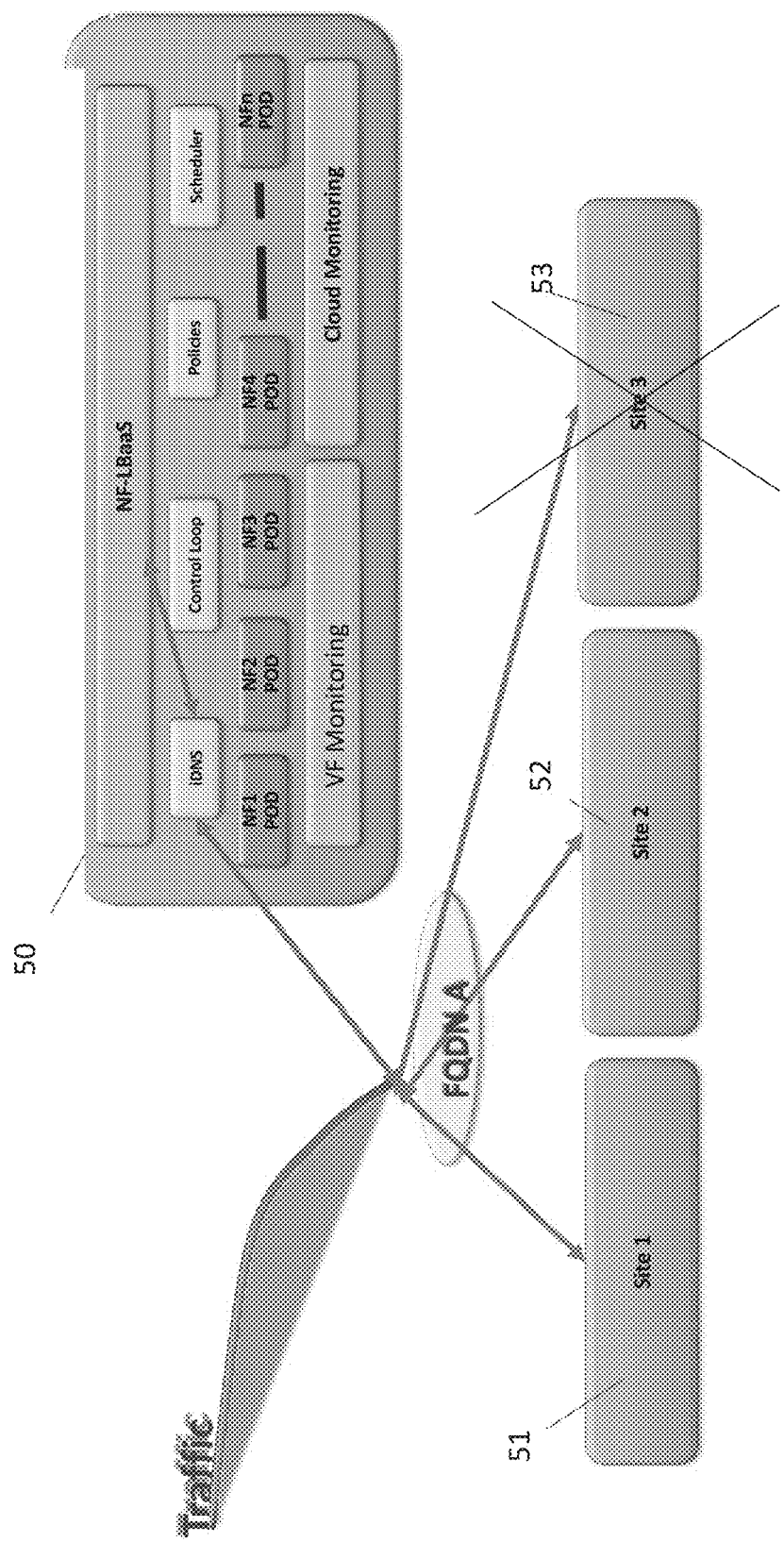
FIG. 7 is a representation of a use case in which a processing unit goes offline.

FIG. 7 illustrates the load balancing function when a site such as site 3 53 goes offline, either because of scheduled maintenance, failure, or perhaps to reassign site 3 53 to a different process. In this case, NFaaS 50 will use the weighted round robin allocation scheme setting the weight for site 3 53 at zero. Once site 3 53 is given a zero weight, the load balancing algorithm will output the load to site 2 52 and site 1 51. The geo-proximity consideration may still yield an output of site 1 51 and site 2 52, and the load (SIP) feedback may designate an output favoring site 2 52. Again, this has the advantage of not requiring any changes to the configuration of mobile devices and cuts down on the necessity for retries for site 3 53 or time-outs waiting for responses from site 3 53.

Figure 8:
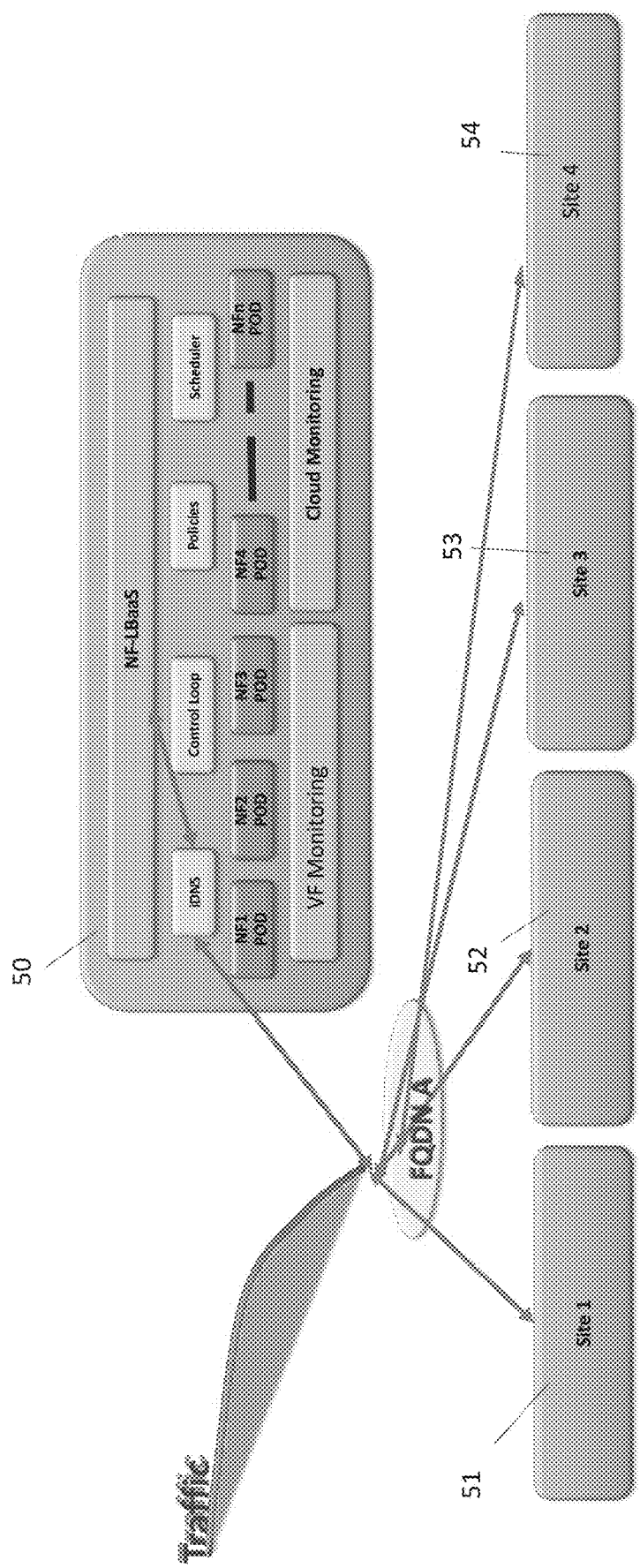
FIG. 8 is a representation of a use case in which additional processing sites are brought on-line to support additional processing requirements.

FIG. 8 shows an exemplary configuration for several use cases in which NFaaS may prove advantageous for both the network provider and an entity subscribing to such a service. There is shown the addition of site 4 54 which may be used to dynamically add capacity for the additional instantiation of VFs associated with the provided network functions. The policies may be adjusted such that the round robin weighting allocation becomes equal among all 4 sites shown. Site 4 54 may be chosen to be in geo-proximity to sites 2 52 and site 3 53 and the allocated virtual functions be chosen to take advantage of any performance advantages due to the geo-proximity of the sites 52, 53 54. The policies may also be adjusted such that the load (SIP) feedback is monitored from the newly added site 4 54. The addition of site 4 54 in this manner maintains the common configuration of the connected mobile devices such that the addition of a site is transparent to the mobile devices. In a similar manner, if there is detected a decrease in processing requirements for the provisioned network functions, this configuration will permit dynamically reducing the number of sites assigned to host virtual functions. There is no requirement that the first deactivated site be the most recently activated site. In other words, in a dynamically deactivating site scenario, any one of the assigned sites may be released based on policy considerations.

Another use case illustrated in FIG. 8 is the ability to provide elasticity in processing requirements wherein additional sites, and consequently, additional virtual functions, may be made available as part of the provision of network functions. In this case, the policy logic may be based on SIP load feedback from site 2 52. There may be a special event such as the launch of a new handset or a popular promotion that causes what otherwise may be an overload of virtual functions hosted at site 2 52. Based on a feedback trigger, which may, for example, be automatic based on loading parameters and guidelines or be performed manually by an operator monitoring the loading, additional site 4 54 may be brought online to provide the elasticity to accommodate the additional loading at site 2 52. The policies may use the geo-proximity of site 2 52, site 3 53 and site 4 54 to weight the round robin allocation between those sites. The load balancer 18 may continue to monitor the load and when the demand on site 2 52 recedes, then site 4 54 may be taken offline and the load become distributed among the original three sites.

Figure 9:
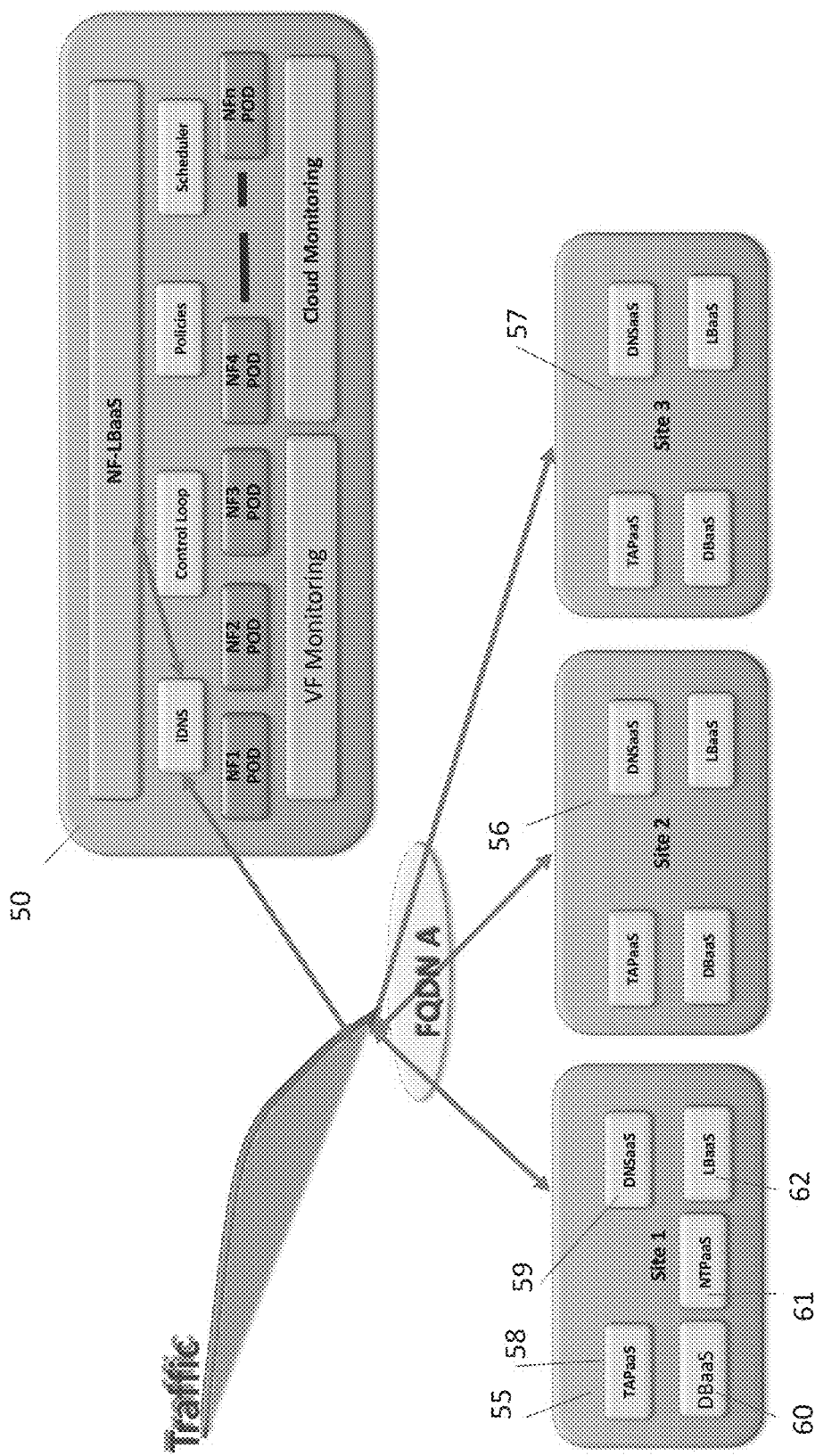
FIG. 9 is a representation of a use case showing network platform as a service framework.

Turning to FIG. 9, there is shown an alternative embodiment wherein sites that originally were assigned to host virtual functions may host virtual network platform as a service for customers. Three sites are shown, site 1 55, site 2 56 and site 3 57. Various network functions may be included within each network function platform as a service, depending on the processing requirement and functionality of the customer applications. For example, site 1 55 shows a platform that includes TAPaaS 58, DNSaaS 59, DBaaS 60, NTPaaS 61, and LBaaS 62. In this example, DNSaaS 59 and NTPaaS 61 may be used by customers that otherwise would have no internet access. DNSaaS 59 and NTPaaS 61 may also be used by customers that have internet access but prefer to use the functionality provided by the NF-PaaS at site 1 55. TAPaaS 61 may be used for mirroring.

Figure 10:
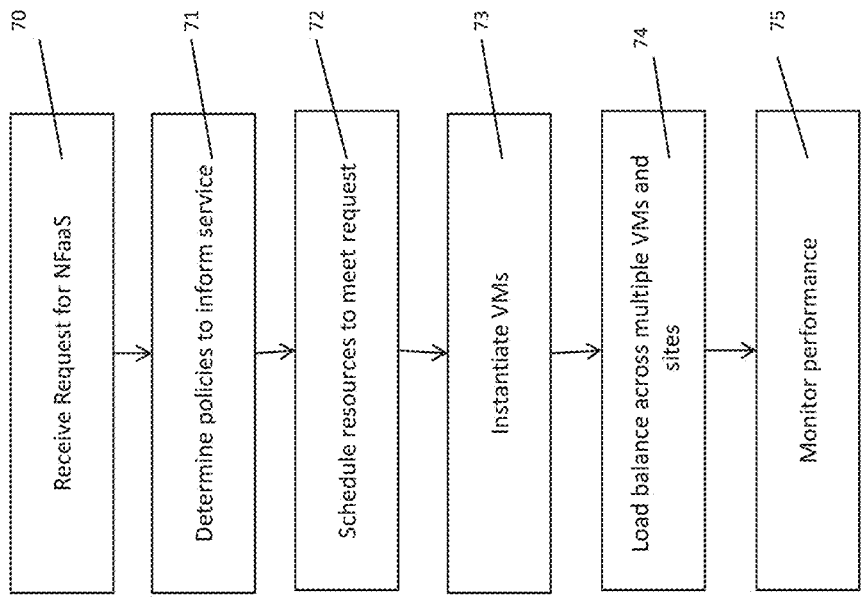
FIG. 10 is a flow diagram of an exemplary method in accordance with the present disclosure.
Figure 11:
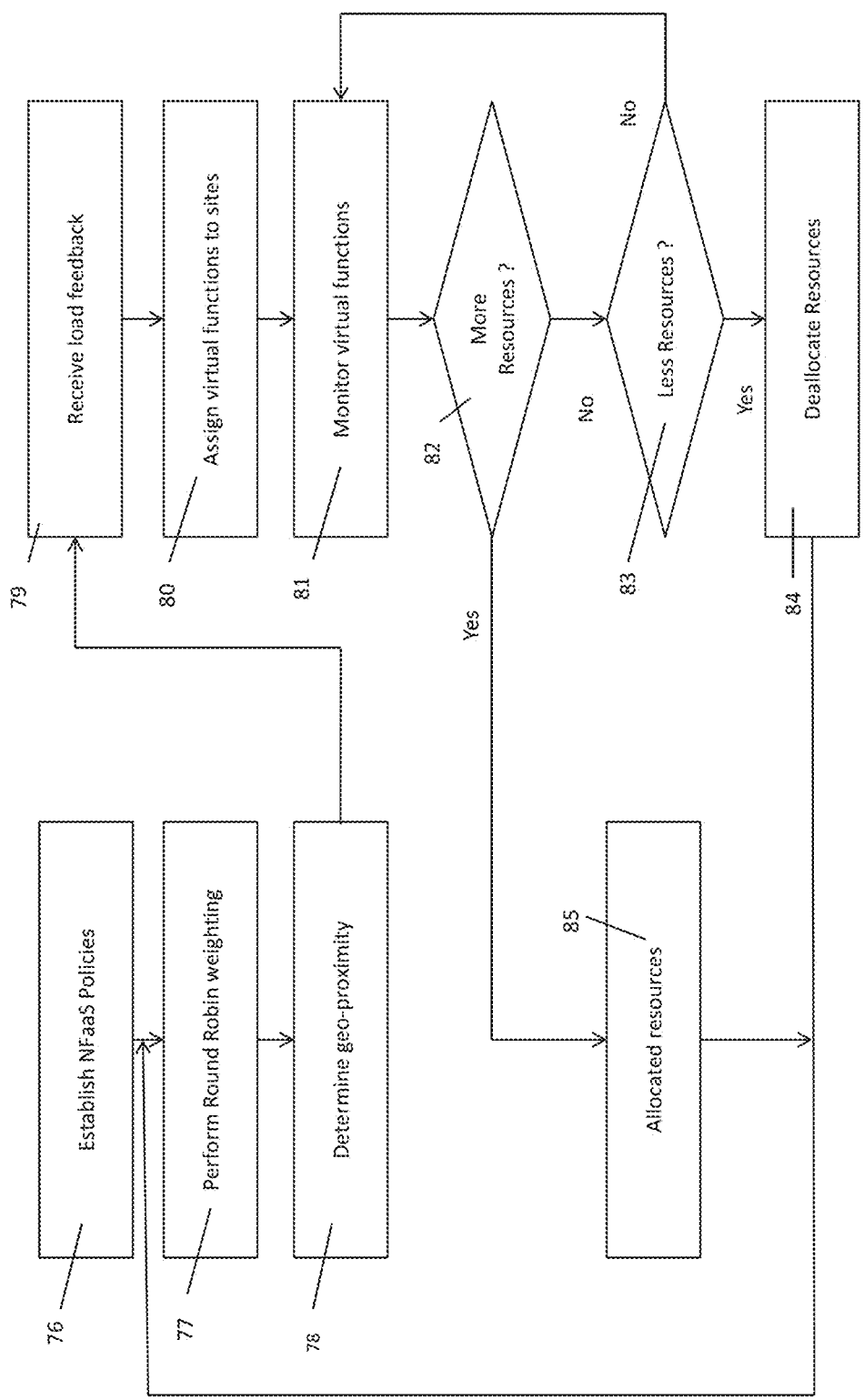
FIG. 11 is a flow diagram of another exemplary method in accordance with the present disclosure.

While there may be many exemplary methods of use of NFaaS, two examples are included in this specification. With reference to FIG. 10, there is shown a flow diagram which generally provides the construct for a method in accordance with the present disclosure. At 70, the network operator may receive a request for a particular service to be provided by the service provider. At 71, the policies that will inform the service are determined. The policies set forth above with respect to the use cases in FIGS. 7-9 are examples of such policies. Other such policies may include loading thresholds, weighting, redundancy requirements, cloud storage utilization, and other policy considerations for the network operator to offer to its customers. At 72, virtual resources are schedule to meet the request for network functions as a service, including the number and type of virtual functions and virtual machines required to meet the request. At 73, virtual machines and virtual functions are instantiated. At 74, load balancing may be performed across virtual machines and physical sites. At 75, the VF monitoring function will monitor feedback from the network and adjust accordingly.

With reference to FIG. 10, there is shown another exemplary flow diagram in accordance with the present disclosure. At 75, the policies for network function as a service are established. The policies may be established by the network in accordance with the network provider's policies or adapted to the customer in accordance with the customer's policies. At 77 round robin weighting of the sites to be utilized is performed. The weights among the various sites may be equal or may be adjusted for a variety of reasons, including having a weight of zero if a site is off-line due to maintenance or otherwise. At 78, potential sites are analyzed based on geo-proximity to each other and perhaps to an external network or data source being used by the customer or service provider. At 79, one or more sites are selected to monitor and receive feedback relating to the loading. At 80, virtual functions running at the various selected sites are monitored for function and performance. At 82, the system dynamically determines if more resources are needed in which case the additional resources are allocated at 85. If no, the system dynamically determines whether less resources are needed. If not, then the monitoring continues in real time at 81. If less resources are needed, then resources are deallocated at 84 in accordance with the policy considerations and the load balancing and monitoring loop continues at 77.

As can be seen from the afore-mentioned examples of the systems and methods of the present disclosure, using NFaaS may reduce upfront costs through reduced capital investment wherein such costs may be shifted to operational costs. In turn, there may be reduced operational costs via streamlined processes, based on central policy development and control, impacting headcount as well as management and maintenance costs. Moreover, entirely new capabilities provided to customers in non-traditional areas such as analytics, quality of service reporting, customer engagement, remote or mobile access, and disaster recovery may be provided. The system provider may have the ability to rapidly adjust capacity to support new workloads and peak workloads during particular cycles, or optimize utilization across the organization. Moreover, customers may be able to benefit through rapid deployment of additional networking equipment, software capabilities, and capacity to support new business initiatives and reduce time to market.

Figure 21:
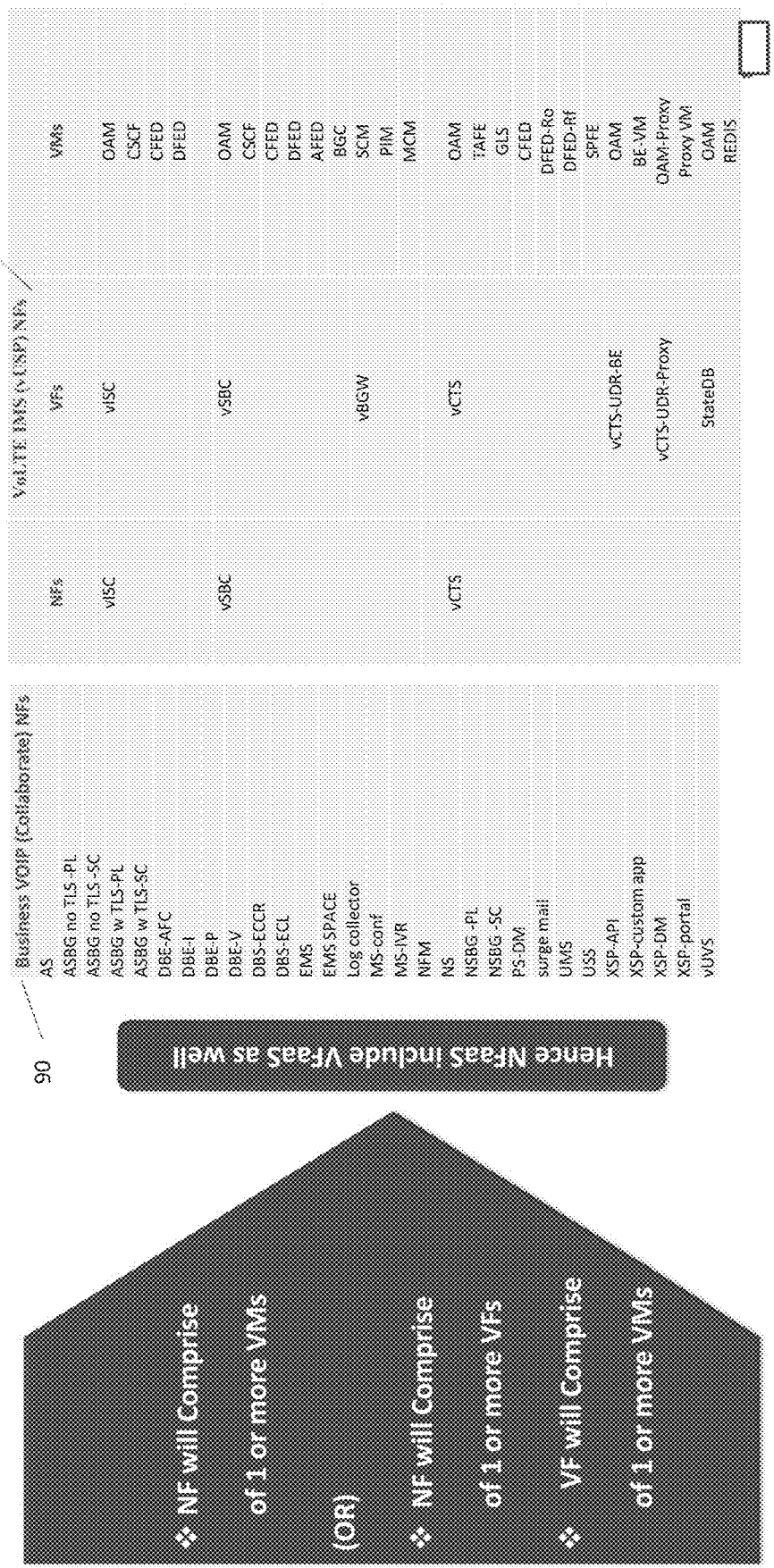
FIG. 21 illustrates examples of Network Function as a Service.

FIG. 21 illustrates some examples of NFaaS which may also include virtual functions as a service as well. There is shown a first chart 90f exemplary business voice over IP (VOIP) network functions. A second chart 92 shows exemplary functionality of voice over LTE functionality (VoLTE) functionality which may include network functions, virtual functions and virtual machines as shown.

Moving to a NFaaS model can lower hardware and management costs, but also goes beyond just moving existing on-premises infrastructure to a service provider; it delivers increased business value as well. Many NaaS provider may be able to offer interactive customer portals that provide insights into metrics on network usage, security incidents/attacks and user statistics.

It should be understood that the above described use cases are exemplary only and are not intended to limit the disclosure or the scope of the appended claims in any way.

Software Defined Network Detailed Description

Figure 12:
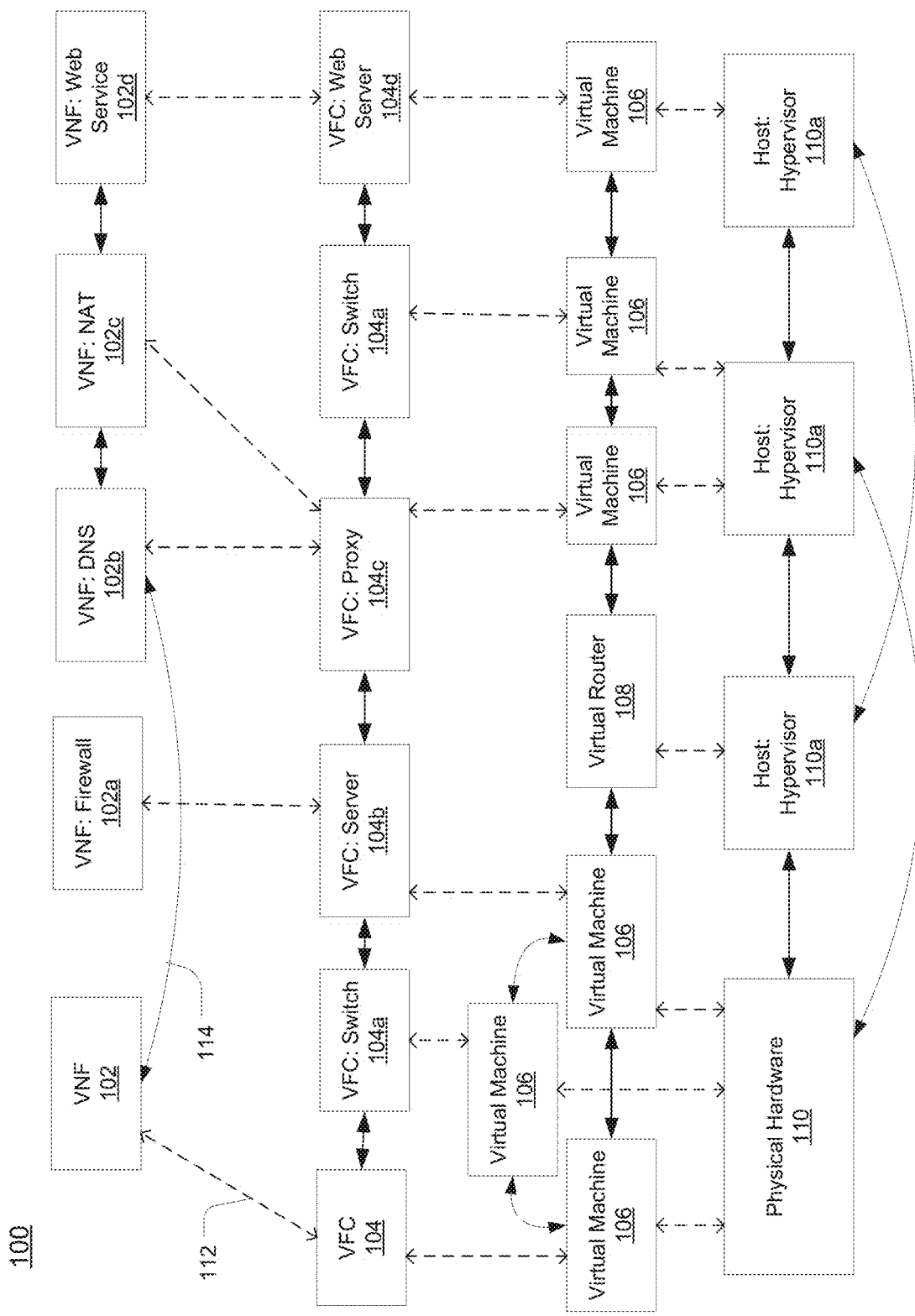
FIG. 12 is a representation of an exemplary software defined network.

In order to better understand the above-described systems and methods of the present disclosure, a more detailed description of an exemplary network is included herein. FIG. 12 is a representation of an exemplary network 100. Network 100 may comprise a Software Defined Network (SDN)—that is, network 100 may include one or more virtualized functions implemented on general purpose hardware, such as in lieu of having dedicated hardware for every network function. That is, general purpose hardware of network 100 may be configured to run virtual network elements to support communication services, such as mobility services, including consumer services and enterprise services. These services may be provided or measured in sessions.

Virtual network functions (VNFs) 102 may be able to support a limited number of sessions. Each VNF 102 may have a VNF type that indicates its functionality or role. For example, FIG. 12 illustrates a gateway VNF 102a and a policy and charging rules function (PCRF) VNF 102b. Additionally or alternatively, VNFs 102 may include other types of VNFs. Each VNF 102 may use one or more virtual machines (VMs) 106 to operate. Each VM 106 may have a VM type that indicates its functionality or role. For example, FIG. 12 illustrates multiple VMs 106 that may include MCM VM, an ASM VM, and a DEP VM. Additionally or alternatively, VMs 106 may include other types of VMs. Each VM 106 may consume various network resources from a server 112, such as a resource 108, a virtual central processing unit (vCPU) 108a, memory 108b, or a network interface card (NIC) 108c in FIG. 13. Additionally or alternatively, server 112 may include other types of resources 108.

Figure 13:
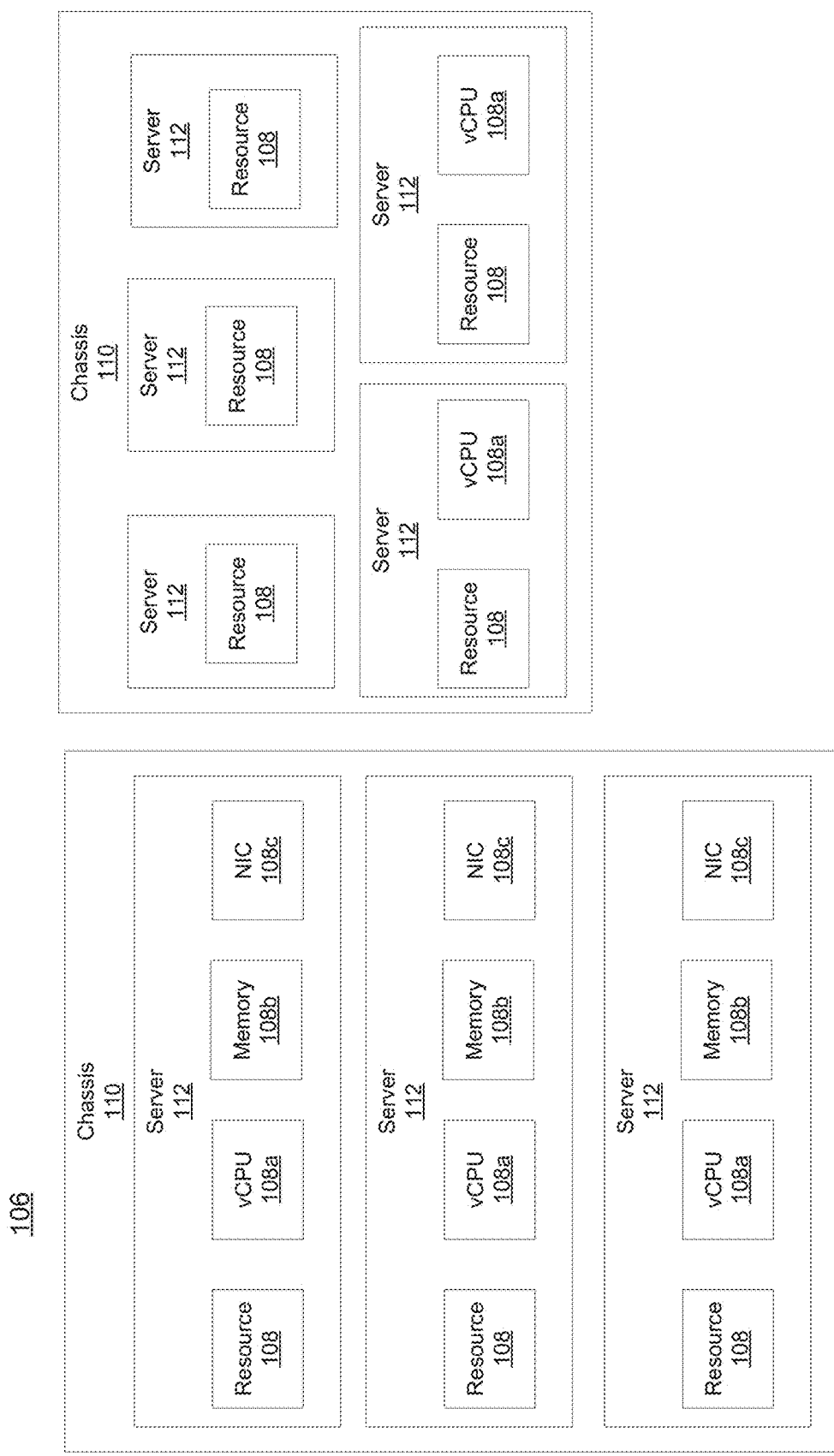
FIG. 13 is a representation of an exemplary hardware platform for a network.

While FIG. 12 illustrates resources collectively contained in hardware platform 911, the configuration of hardware platform 911 may isolate, for example, certain memory 108b from other memory 108b FIG. 13 provides an exemplary implementation of hardware platform 910.

Hardware platform 911 may comprise one or more chasses 110. Chassis 110 may refer to the physical housing or platform for multiple servers 112 or other network equipment. In an aspect, chassis 110 may also refer to the underlying network equipment. Chassis 110 may include one or more servers 112. Server 112 may comprise general purpose computer hardware or a computer. In an aspect, chassis 110 may comprise a metal rack, and servers 112 of chassis 110 may comprise blade servers that are physically mounted in or on chassis 110.

Each server 112 may include one or more network resources 108, as illustrated. Servers 112 may be communicatively coupled together (not shown) in any combination or arrangement. For example, all servers 112 within a given chassis 110 may be communicatively coupled. As another example, servers 112 in different chasses 110 may be communicatively coupled. Additionally or alternatively, chasses 110 may be communicatively coupled together (not shown) in any combination or arrangement.

The characteristics of each chassis 110 and each server 112 may differ. For example, FIG. 13 illustrates that the number of servers 112 within two chasses 110 may vary. Additionally or alternatively, the type or number of resources 108 within each server 112 may vary. In an aspect, chassis 110 may be used to group servers 112 with the same resource characteristics. In another aspect, servers 112 within the same chassis 110 may have different resource characteristics.

Given hardware platform 911, the number of sessions that may be instantiated may vary depending upon how efficiently resources 108 are assigned to different VMs 106. For example, assignment of VMs 106 to particular resources 108 may be constrained by one or more rules. For example, a first rule may require that resources 108 assigned to a particular VM 106 be on the same server 112 or set of servers 112. For example, if VM 106 uses eight vCPUs 108a, 1 GB of memory 108b, and 2 NICs 108c, the rules may require that all of these resources 108 be sourced from the same server 112. Additionally or alternatively, VM 106 may require splitting resources 108 among multiple servers 112, but such splitting may need to conform with certain restrictions. For example, resources 108 for VM 106 may be able to be split between two servers 112. Default rules may apply. For example, a default rule may require that all resources 108 for a given VM 106 must come from the same server 112.

An affinity rule may restrict assignment of resources 108 for a particular VM 106 (or a particular type of VM 106). For example, an affinity rule may require that certain VMs 106 be instantiated on (that is, consume resources from) the same server 112 or chassis 110. For example, if VNF 102 uses six MCM VMs 106, an affinity rule may dictate that those six MCM VMs 106 be instantiated on the same server 112 (or chassis 110). As another example, if VNF 102 uses MCM VMs 106, ASM VMs 106, and a third type of VMs 106, an affinity rule may dictate that at least the MCM VMs 106 and the ASM VMs 1046 be instantiated on the same server 112 (or chassis 110). Affinity rules may restrict assignment of resources 108 based on the identity or type of resource 108, VNF 102, VM 106, chassis 110, server 112, or any combination thereof.

An anti-affinity rule may restrict assignment of resources 108 for a particular VM 106 (or a particular type of VM 106). In contrast to an affinity rule—which may require that certain VMs 106 be instantiated on the same server 112 or chassis 110—an anti-affinity rule requires that certain VMs 106 be instantiated on different servers 112 (or different chasses 110). For example, an anti-affinity rule may require that MCM VM 106 be instantiated on a particular server 112 that does not contain any ASM VMs 106. As another example, an anti-affinity rule may require that MCM VMs 106 for a first VNF 102 be instantiated on a different server 112 (or chassis 110) than MCM VMs 106 for a second VNF 102. Anti-affinity rules may restrict assignment of resources 108 based on the identity or type of resource 108, VNF 102, VM 106, chassis 110, server 112, or any combination thereof.

Within these constraints, resources 108 of servers 112 may be assigned to be used to instantiate VMs 106, which in turn may be used to instantiate VNFs 102, which in turn may be used to establish sessions. The different combinations for how such resources 108 may be assigned may vary in complexity and efficiency. For example, different assignments may have different limits of the number of sessions that can be established given a particular server 112.

For example, consider a session that may require gateway VNF 102a and PCRF VNF 102b. Gateway VNF 102a may require five VMs 106 instantiated on the same server 112, and PCRF VNF 102b may require two VMs 104 instantiated on the same server 112. (Assume, for this example, that no affinity or anti-affinity rules restrict whether VMs 106 for PCRF VNF 102b may or must be instantiated on the same or different server 112 than VMs 106 for gateway VNF 102a.) In this example, each of two servers 112 may have sufficient resources 108 to support 10 VMs 106. To implement sessions using these two servers 112, first server 112 may be instantiated with 10 VMs 106 to support two instantiations of gateway VNF 102a, and second server 112 may be instantiated with 9 VMs: five VMs 106 to support one instantiation of gateway VNF 102a and four VMs 106 to support two instantiations of PCRF VNF 102b. This may leave the remaining resources 108 that could have supported the tenth VM 108 on second server 112 unused (and unusable for an instantiation of either a gateway VNF 102a or a PCRF VNF 102b). Alternatively, first server 112 may be instantiated with 10 VMs 106 for two instantiations of gateway VNF 102a and second server 112 may be instantiated with 10 VMs 106 for five instantiations of PCRF VNF 102b, using all available resources 108 to maximize the number of VMs 106 instantiated.

Consider, further, how many sessions each gateway VNF 102a and each PCRF VNF 102b may support. This may factor into which assignment of resources 108 is more efficient. For example, consider if each gateway VNF 102a supports two million sessions, and if each PCRF VNF 102b supports three million sessions. For the first configuration—three total gateway VNFs 102a (which satisfy the gateway requirement for six million sessions) and two total PCRF VNFs 102b (which satisfy the PCRF requirement for six million sessions)—would support a total of six million sessions. For the second configuration—two total gateway VNFs 102a (which satisfy the gateway requirement for four million sessions) and five total PCRF VNFs 102b (which satisfy the PCRF requirement for 15 million sessions)—would support a total of four million sessions. Thus, while the first configuration may seem less efficient looking only at the number of available resources 108 used (as resources 108 for the tenth possible VM 106 are unused), the second configuration is actually more efficient from the perspective of being the configuration that can support the greater number of sessions.

To solve the problem of determining a capacity (or, number of sessions) that can be supported by a given hardware platform 911, a given requirement for VNFs 102 to support a session, a capacity for the number of sessions each VNF 102 (e.g., of a certain type) can support, a given requirement for VMs 106 for each VNF 102 (e.g., of a certain type), a given requirement for resources 108 to support each VM 106 (e.g., of a certain type), rules dictating the assignment of resources 108 to one or more VMs 106 (e.g., affinity and anti-affinity rules), the chasses 110 and servers 112 of hardware platform 911, and the individual resources 108 of each chassis 110 or server 112 (e.g., of a certain type), an integer programming problem may be formulated.

First, a plurality of index sets may be established. For example, index set L may include the set of chasses 110. For example, if a system allows up to 6 chasses 110, this set may be:

$$L=\{1, 2, 3, 4, 5, 6\},$$

where 1 is an element of L.

Another index set J may include the set of servers 112. For example, if a system allows up to 16 servers 112 per chassis 110, this set may be:

$$J=\{1, 2, 3, \ldots, 16\},$$

where j is an element of J

As another example, index set K having at least one element k may include the set of VNFs 102 that may be considered. For example, this index set may include all types of VNFs 102 that may be used to instantiate a service. For example, let $$K=\{GW, PCRF\}$$

where GW represents gateway VNFs 102a and PCRF represents PCRF VNFs 102b.

Another index set I(k) may equal the set of VMs 106 for a VNF 102k. Thus, let $$I(GW)=\{MCM, ASM, IOM, WSM, CCM, DCM\}$$

represent VMs 106 for gateway VNF 102a, where MCM represents MCM VM 106, ASM represents ASM VM 106, and each of IOM, WSM, CCM, and DCM represents a respective type of VM 106. Further, let $$I(PCRF)=\{DEP, DIR, POL, SES, MAN\}$$

represent VMs 106 for PCRF VNF 102b, where DEP represents DEP VM 106 and each of DIR, POL, SES, and MAN represent a respective type of VM 106.

Another index set V may include the set of possible instances of a given VM 104. For example, if a system allows up to 20 instances of VMs 106, this set may be:

$$V=\{1, 2, 3, \ldots, 20\},$$

where v is an element of V.

In addition to the sets, the integer programming problem may include additional data. The characteristics of VNFs 102, VMs 106, chasses 110, or servers 112 may be factored into the problem. This data may be referred to as parameters. For example, for given VNF 102k, the number of sessions that VNF 102k can support may be defined as a function S(k). In an aspect, for an element k of set K, this parameter may be represented by $$S(k)>=0;$$

as a measurement of the number of sessions k can support. Returning to the earlier example where gateway VNF 102a may support 2 million sessions, then this parameter may be S(GW)=2,000,000.

VM 106 modularity may be another parameter in the integer programming problem. VM 106 modularity may represent the VM 106 requirement for a type of VNF 102. For example, for k that is an element of set K and i that is an element of set I, each instance of VNF k may require M(k, i) instances of VMs 106. For example, recall the example where $$I(GW)=\{MCM, ASM, IOM, WSM, CCM, DCM\}.$$

In an example, M(GW, I(GW)) may be the set that indicates the number of each type of VM 106 that may be required to instantiate gateway VNF 102a. For example, $$M(GW, I(GW))=\{2, 16, 4, 4, 2, 4\}$$

may indicate that one instantiation of gateway VNF 102a may require two instantiations of MCM VMs 106, 16 instantiations of ACM VM 106, four instantiations of IOM VM 106, four instantiations of WSM VM 106, two instantiations of CCM VM 106, and four instantiations of DCM VM 106.

Another parameter may indicate the capacity of hardware platform 910. For example, a parameter C may indicate the number of vCPUs 108a required for each VM 106 type i and for each VNF 102 type k. For example, this may include the parameter C(k, i).

For example, if MCM VM 106 for gateway VNF 102a requires 20 vCPUs 108a, this may be represented as $$C(GW, MCM)=20.$$

However, given the complexity of the integer programming problem—the numerous variables and restrictions that must be satisfied—implementing an algorithm that may be used to solve the integer programming problem efficiently, without sacrificing optimality, may be difficult.

Figure 14:
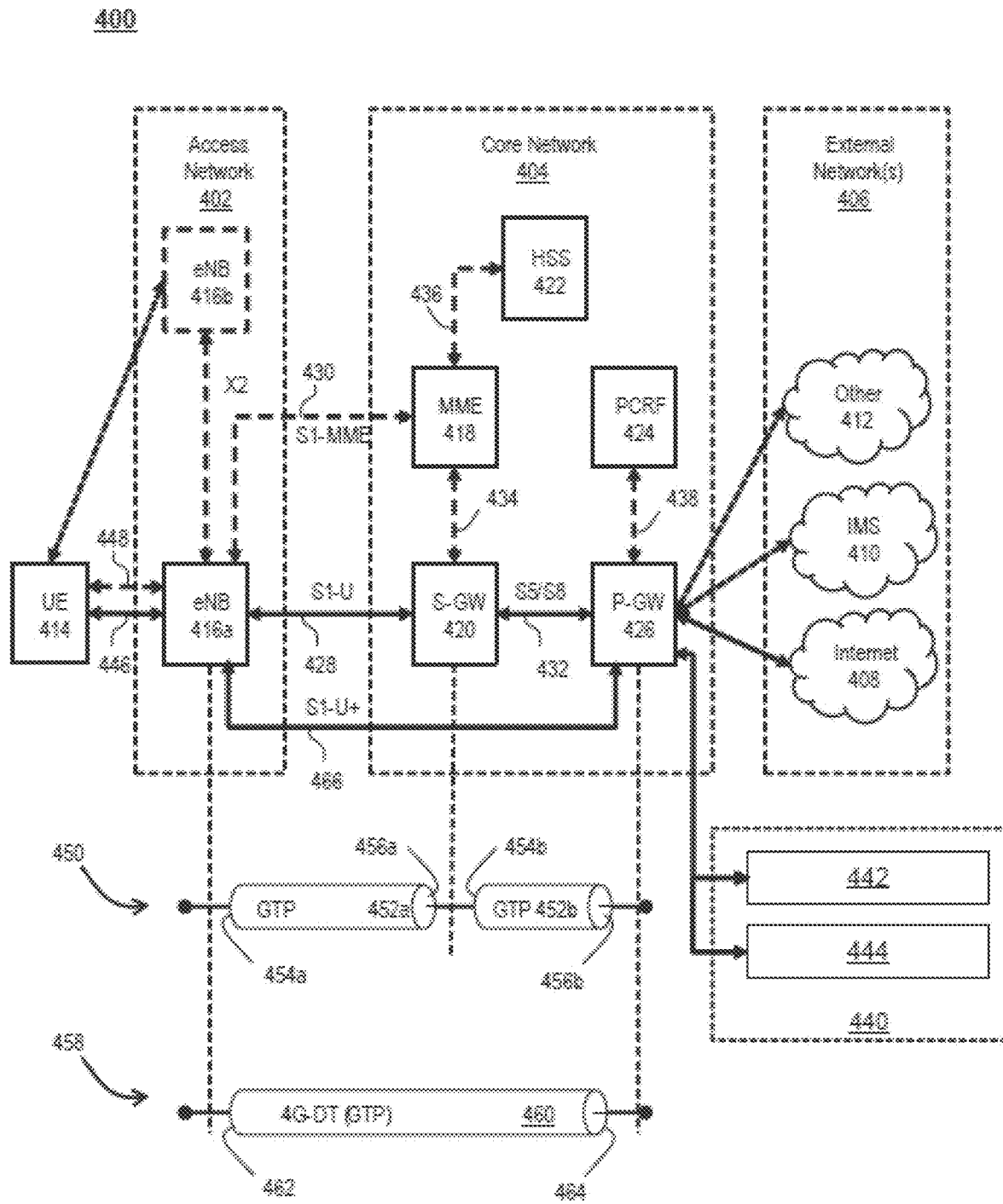
FIG. 14 is an illustration of a functional block diagram depicting one example of a Long Term Evolution-Evolved Packet System (LTE-EPS) network architecture.

FIG. 14 illustrates a functional block diagram depicting one example of an LTE-EPS network architecture 400 that may be at least partially implemented as an SDN. Network architecture 400 disclosed herein is referred to as a modified Long Term Evolution/Evolved Packet System (LTE-EPS) architecture 400 to distinguish it from a traditional LTE-EPS architecture.

An example modified LTE-EPS architecture 400 is based at least in part on standards developed by the 3rd Generation Partnership Project (3GPP), with information available at www.3gpp.org. LTE-EPS network architecture 400 may include an access network 402, a core network 404, e.g., an Evolved Packet Core (EPC) or Common BackBone (CBB) and one or more external networks 406, sometimes referred to as Packet Data Network (PDN) or peer entities. Different external networks 406 can be distinguished from each other by a respective network identifier, e.g., a label according to Domain Name Server (DNS) naming conventions describing an access point to the PDN. Such labels can be referred to as Access Point Names (APN). External networks 406 can include one or more trusted and non-trusted external networks such as an internet protocol (IP) network 408, an IP multimedia subsystem (IMS) network 410, and other networks 412, such as a service network, a corporate network, or the like. In an aspect, access network 402, core network 404, or external network 406 may include or communicate with network 100.

Access network 402 can include an LTE network architecture sometimes referred to as Evolved Universal mobile Telecommunication system Terrestrial Radio Access (E UTRA) and evolved UMTS Terrestrial Radio Access Network (E-UTRAN). Broadly, access network 402 can include one or more communication devices, commonly referred to as User Equipment (UE) 414, and one or more wireless access nodes, or base stations 416a, 416b. During network operations, at least one base station 416 communicates directly with UE 414. Base station 416 can be an evolved Node B (e-NodeB), with which UE 414 communicates over the air and wirelessly. UEs 414 can include, without limitation, wireless devices, e.g., satellite communication systems, portable digital assistants (PDAs), laptop computers, tablet devices and other mobile devices (e.g., cellular telephones, smart appliances, and so on). UEs 414 can connect to eNBs 416 when UE 414 is within range according to a corresponding wireless communication technology.

UE 414 generally runs one or more applications that engage in a transfer of packets between UE 414 and one or more external networks 406. Such packet transfers can include one of downlink packet transfers from external network 406 to UE 414, uplink packet transfers from UE 414 to external network 406 or combinations of uplink and downlink packet transfers. Applications can include, without limitation, web browsing, Voice over IP (VoIP), streaming media and the like. Each application can pose different Quality of Service (QoS) requirements on a respective packet transfer. Different packet transfers can be served by different bearers within core network 404, e.g., according to parameters, such as the QoS.

Core network 404 uses a concept of bearers, e.g., EPS bearers (virtual connections between UEs and Packet Gateways, PGWs), to route packets, e.g., IP traffic, between a particular gateway in core network 404 and UE 414. A bearer refers generally to an IP packet flow with a defined QoS between the particular gateway and UE 414. Access network 402, e.g., E UTRAN, and core network 404 together set up and release bearers as required by the various applications. Bearers can be classified in at least two different categories: (i) minimum guaranteed bit rate bearers, e.g., for applications, such as Voice Over IP (VoIP); and (ii) non-guaranteed bit rate bearers that do not require guarantee bit rate, e.g., for applications, such as web browsing.

In one embodiment, the core network 404 includes various network entities, such as Mobility Management Entity (MME) 418, Serving Gateway (SGW) 420, Home Subscriber Server (HSS) 422, Policy and Charging Rules Function (PCRF) 424 and Packet Data Network Gateway (PGW) 426. In one embodiment, MME 418 comprises a control node performing a control signaling between various equipment and devices in access network 402 and core network 404. The protocols running between UE 414 and core network 404 are generally known as Non-Access Stratum (NAS) protocols.

For illustration purposes only, the terms MME 418, SGW 420, HSS 422 and PGW 426, and so on, can be server devices, but may be referred to in the subject disclosure without the word "server." It is also understood that any form of such servers can operate in a device, system, component, or other form of centralized or distributed hardware and software. It is further noted that these terms and other terms such as bearer paths and/or interfaces are terms that can include features, methodologies, and/or fields that may be described in whole or in part by standards bodies such as the 3GPP. It is further noted that some or all embodiments of the subject disclosure may in whole or in part modify, supplement, or otherwise supersede final or proposed standards published and promulgated by 3GPP.

According to traditional implementations of LTE-EPS architectures, SGW 420 routes and forwards all user data packets. SGW 420 also acts as a mobility anchor for user plane operation during handovers between base stations, e.g., during a handover from first eNB 416a to second eNB 416b as may be the result of UE 414 moving from one area of coverage, e.g., cell, to another. SGW 420 can also terminate a downlink data path, e.g., from external network 406 to UE 414 in an idle state, and trigger a paging operation when downlink data arrives for UE 414. SGW 420 can also be configured to manage and store a context for UE 414, e.g., including one or more of parameters of the IP bearer service and network internal routing information. In addition, SGW 420 can perform administrative functions, e.g., in a visited network, such as collecting information for charging (e.g., the volume of data sent to or received from the user), and/or replicate user traffic, e.g., to support a lawful interception. SGW 420 also serves as the mobility anchor for interworking with other 3GPP technologies such as universal mobile telecommunication system (UMTS).

At any given time, UE 414 is generally in one of three different states: detached, idle, or active. The detached state is typically a transitory state in which UE 414 is powered on but is engaged in a process of searching and registering with network 402. In the active state, UE 414 is registered with access network 402 and has established a wireless connection, e.g., radio resource control (RRC) connection, with eNB 416. Whether UE 414 is in an active state can depend on the state of a packet data session, and whether there is an active packet data session. In the idle state, UE 414 is generally in a power conservation state in which UE 414 typically does not communicate packets. When UE 414 is idle, SGW 420 can terminate a downlink data path, e.g., from one peer entity 406, and triggers paging of UE 414 when data arrives for UE 414. If UE 414 responds to the page, SGW 420 can forward the IP packet to eNB 416a.

HSS 422 can manage subscription-related information for a user of UE 414. For example, HSS 422 can store information such as authorization of the user, security requirements for the user, quality of service (QoS) requirements for the user, etc. HSS 422 can also hold information about external networks 406 to which the user can connect, e.g., in the form of an APN of external networks 406. For example, MME 418 can communicate with HSS 422 to determine if UE 414 is authorized to establish a call, e.g., a voice over IP (VoIP) call before the call is established.

PCRF 424 can perform QoS management functions and policy control. PCRF 424 is responsible for policy control decision-making, as well as for controlling the flow-based charging functionalities in a policy control enforcement function (PCEF), which resides in PGW 426. PCRF 424 provides the QoS authorization, e.g., QoS class identifier and bit rates that decide how a certain data flow will be treated in the PCEF and ensures that this is in accordance with the user's subscription profile.

PGW 426 can provide connectivity between the UE 414 and one or more of the external networks 406. In illustrative network architecture 400, PGW 426 can be responsible for IP address allocation for UE 414, as well as one or more of QoS enforcement and flow-based charging, e.g., according to rules from the PCRF 424. PGW 426 is also typically responsible for filtering downlink user IP packets into the different QoS-based bearers. In at least some embodiments, such filtering can be performed based on traffic flow templates. PGW 426 can also perform QoS enforcement, e.g., for guaranteed bit rate bearers. PGW 426 also serves as a mobility anchor for interworking with non-3GPP technologies such as CDMA2000.

Within access network 402 and core network 404 there may be various bearer paths/interfaces, e.g., represented by solid lines 428 and 430. Some of the bearer paths can be referred to by a specific label. For example, solid line 428 can be considered an S1-U bearer and solid line 432 can be considered an S5/S8 bearer according to LTE-EPS architecture standards. Without limitation, reference to various interfaces, such as S1, X2, S5, S8, S11 refer to EPS interfaces. In some instances, such interface designations are combined with a suffix, e.g., a "U" or a "C" to signify whether the interface relates to a "User plane" or a "Control plane." In addition, the core network 404 can include various signaling bearer paths/interfaces, e.g., control plane paths/interfaces represented by dashed lines 430, 434, 436, and 438. Some of the signaling bearer paths may be referred to by a specific label. For example, dashed line 430 can be considered as an S1-MME signaling bearer, dashed line 434 can be considered as an S11 signaling bearer and dashed line 436 can be considered as an S6a signaling bearer, e.g., according to LTE-EPS architecture standards. The above bearer paths and signaling bearer paths are only illustrated as examples and it should be noted that additional bearer paths and signaling bearer paths may exist that are not illustrated.

Also shown is a novel user plane path/interface, referred to as the S1-U+ interface 466. In the illustrative example, the S1-U+ user plane interface extends between the eNB 416a and PGW 426. Notably, S1-U+ path/interface does not include SGW 420, a node that is otherwise instrumental in configuring and/or managing packet forwarding between eNB 416a and one or more external networks 406 by way of PGW 426. As disclosed herein, the S1-U+ path/interface facilitates autonomous learning of peer transport layer addresses by one or more of the network nodes to facilitate a self-configuring of the packet forwarding path. In particular, such self-configuring can be accomplished during handovers in most scenarios so as to reduce any extra signaling load on the S/PGWs 420, 426 due to excessive handover events.

In some embodiments, PGW 426 is coupled to storage device 440, shown in phantom. Storage device 440 can be integral to one of the network nodes, such as PGW 426, for example, in the form of internal memory and/or disk drive. It is understood that storage device 440 can include registers suitable for storing address values. Alternatively or in addition, storage device 440 can be separate from PGW 426, for example, as an external hard drive, a flash drive, and/or network storage.

Storage device 440 selectively stores one or more values relevant to the forwarding of packet data. For example, storage device 440 can store identities and/or addresses of network entities, such as any of network nodes 418, 420, 422, 424, and 426, eNBs 416 and/or UE 414. In the illustrative example, storage device 440 includes a first storage location 442 and a second storage location 444. First storage location 442 can be dedicated to storing a Currently Used Downlink address value 442. Likewise, second storage location 444 can be dedicated to storing a Default Downlink Forwarding address value 444. PGW 426 can read and/or write values into either of storage locations 442, 444, for example, managing Currently Used Downlink Forwarding address value 442 and Default Downlink Forwarding address value 444 as disclosed herein.

In some embodiments, the Default Downlink Forwarding address for each EPS bearer is the SGW S5-U address for each EPS Bearer. The "Currently Used Downlink Forwarding address" for each EPS bearer in PGW 426 can be set every time when PGW 426 receives an uplink packet, e.g., a GTP-U uplink packet, with a new source address for a corresponding EPS bearer. When UE 414 is in an idle state, the "Currently Used Downlink Forwarding address" field for each EPS bearer of UE 414 can be set to a "null" or other suitable value.

In some embodiments, the Default Downlink Forwarding address is only updated when PGW 426 receives a new SGW S5-U address in a predetermined message or messages. For example, the Default Downlink Forwarding address is only updated when PGW 426 receives one of a Create Session Request, Modify Bearer Request and Create Bearer Response messages from SGW 420.

As values 442, 444 can be maintained and otherwise manipulated on a per bearer basis, it is understood that the storage locations can take the form of tables, spreadsheets, lists, and/or other data structures generally well understood and suitable for maintaining and/or otherwise manipulate forwarding addresses on a per bearer basis.

It should be noted that access network 402 and core network 404 are illustrated in a simplified block diagram in FIG. 14. In other words, either or both of access network 402 and the core network 404 can include additional network elements that are not shown, such as various routers, switches and controllers. In addition, although FIG. 14 illustrates only a single one of each of the various network elements, it should be noted that access network 402 and core network 404 can include any number of the various network elements. For example, core network 404 can include a pool (i.e., more than one) of MMEs 418, SGWs 420 or PGWs 426.

In the illustrative example, data traversing a network path between UE 414, eNB 416a, SGW 420, PGW 426 and external network 406 may be considered to constitute data transferred according to an end-to-end IP service. However, for the present disclosure, to properly perform establishment management in LTE-EPS network architecture 400, the core network, data bearer portion of the end-to-end IP service is analyzed.

An establishment may be defined herein as a connection set up request between any two elements within LTE-EPS network architecture 400. The connection set up request may be for user data or for signaling. A failed establishment may be defined as a connection set up request that was unsuccessful. A successful establishment may be defined as a connection set up request that was successful.

In one embodiment, a data bearer portion comprises a first portion (e.g., a data radio bearer 446) between UE 414 and eNB 416a, a second portion (e.g., an S1 data bearer 428) between eNB 416a and SGW 420, and a third portion (e.g., an S5/S8 bearer 432) between SGW 420 and PGW 426. Various signaling bearer portions are also illustrated in FIG. 14. For example, a first signaling portion (e.g., a signaling radio bearer 448) between UE 414 and eNB 416a, and a second signaling portion (e.g., S1 signaling bearer 430) between eNB 416a and MME 418.

In at least some embodiments, the data bearer can include tunneling, e.g., IP tunneling, by which data packets can be forwarded in an encapsulated manner, between tunnel endpoints. Tunnels, or tunnel connections can be identified in one or more nodes of network 100, e.g., by one or more of tunnel endpoint identifiers, an IP address and a user datagram protocol port number. Within a particular tunnel connection, payloads, e.g., packet data, which may or may not include protocol related information, are forwarded between tunnel endpoints.

An example of first tunnel solution 450 includes a first tunnel 452a between two tunnel endpoints 454a and 456a, and a second tunnel 452b between two tunnel endpoints 454b and 456b. In the illustrative example, first tunnel 452a is established between evolved Node B (eNodeB, eNB) 416a and SGW 420. Accordingly, first tunnel 452a includes a first tunnel endpoint 454a corresponding to an S1-U address of eNB 416a (referred to herein as the eNB S1-U address), and second tunnel endpoint 456a corresponding to an S1-U address of SGW 420 (referred to herein as the SGW S1-U address). Likewise, second tunnel 452b includes first tunnel endpoint 454b corresponding to an S5-U address of SGW 420 (referred to herein as the SGW S5-U address), and second tunnel endpoint 456b corresponding to an S5-U address of PGW 426 (referred to herein as the PGW S5-U address).

In at least some embodiments, first tunnel solution 450 is referred to as a two tunnel solution, e.g., according to the General Packet Radio Service (GPRS) Tunneling Protocol User Plane (GTPv1-U based), as described in 3GPP specification TS 29.281, incorporated herein in its entirety. It is understood that one or more tunnels are permitted between each set of tunnel end points. For example, each subscriber can have one or more tunnels, e.g., one for each Packet Data Protocol (PDP) context that they have active, as well as possibly having separate tunnels for specific connections with different quality of service requirements, and so on.

An example of second tunnel solution 458 includes a single or direct tunnel 460 between tunnel endpoints 462 and 464. In the illustrative example, direct tunnel 460 is established between eNB 416a and PGW 426, without subjecting packet transfers to processing related to SGW 420. Accordingly, direct tunnel 460 includes first tunnel endpoint 462 corresponding to the eNB S1-U address, and second tunnel endpoint 464 corresponding to the PGW S5-U address. Packet data received at either end can be encapsulated into a payload and directed to the corresponding address of the other end of the tunnel. Such direct tunneling avoids processing, e.g., by SGW 420 that would otherwise relay packets between the same two endpoints, e.g., according to a protocol, such as the GTP-U protocol.

In some scenarios, direct tunneling solution 458 can forward user plane data packets between eNB 416a and PGW 426, by way of SGW 420. That is, SGW 420 can serve a relay function, by relaying packets between two tunnel endpoints 416a, 426. In other scenarios, direct tunneling solution 458 can forward user data packets between eNB 416a and PGW 426, by way of the S1 U+ interface 466, thereby bypassing SGW 420.

Generally, UE 414 can have one or more bearers at any one time. The number and types of bearers can depend on applications, default requirements, and so on. It is understood that the techniques disclosed herein, including the configuration, management and use of various tunnel solutions 450, 458, can be applied to the bearers on an individual bases. That is, if user data packets of one bearer, say a bearer associated with a VoIP service of UE 414, then the forwarding of all packets of that bearer are handled in a similar manner. Continuing with this example, the same UE 414 can have another bearer associated with it through the same eNB 416a. This other bearer, for example, can be associated with a relatively low rate data session forwarding user data packets through core network 404 simultaneously with the first bearer. Likewise, the user data packets of the other bearer are also handled in a similar manner, without necessarily following a forwarding path or solution of the first bearer. Thus, one of the bearers may be forwarded through direct tunnel 458; whereas, another one of the bearers may be forwarded through a two-tunnel solution 450.

Figure 15:
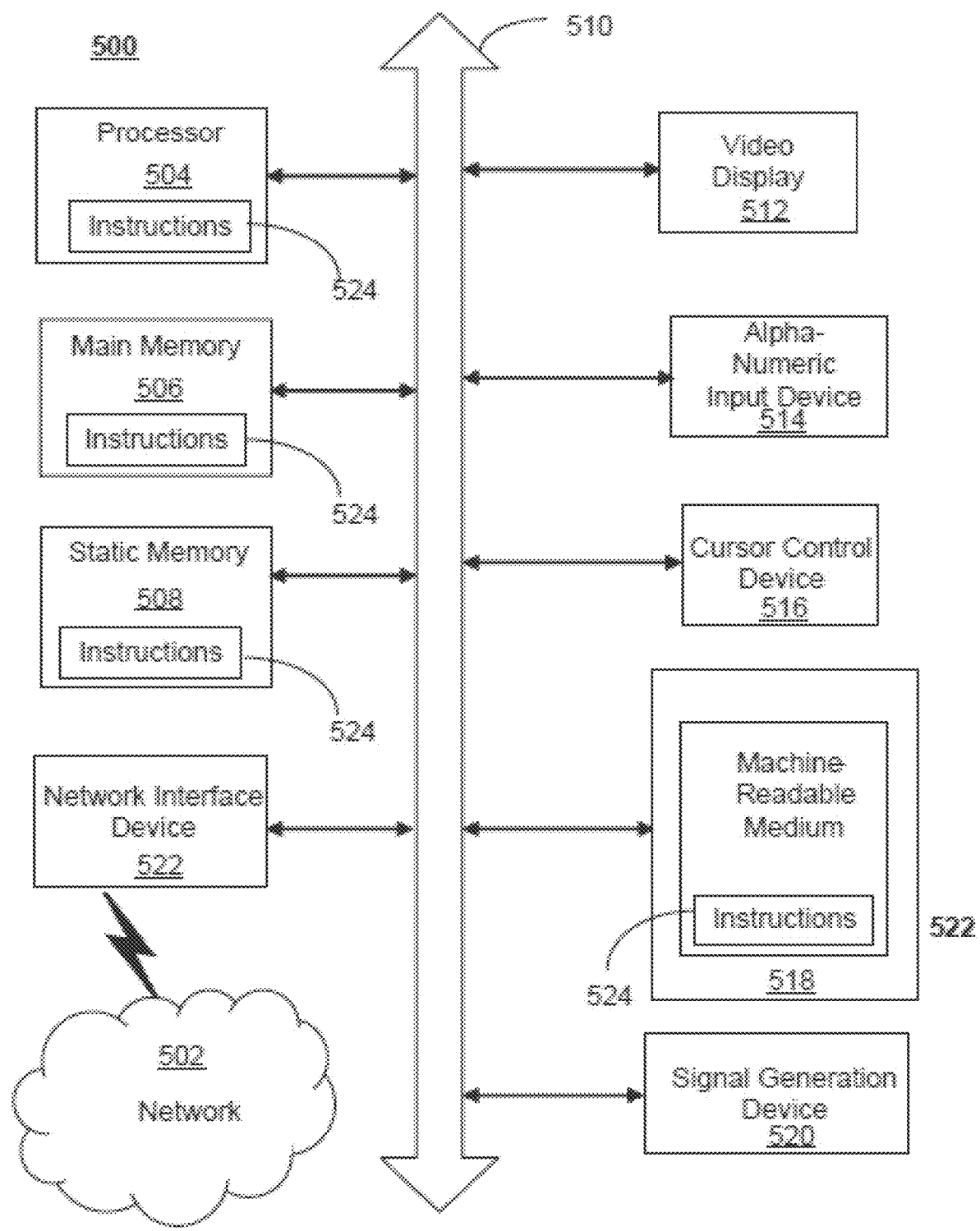
FIG. 15 depicts an exemplary diagrammatic representation of a machine in the form of a computer system.

FIG. 15 depicts an exemplary diagrammatic representation of a machine in the form of a computer system 500 within which a set of instructions, when executed, may cause the machine to perform any one or more of the methods described above. One or more instances of the machine can operate, for example, as processor 504 for UE 414, eNB 416, MME 418, SGW 420, HSS 422, PCRF 424, PGW 426 and other devices. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 518 having instructions 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 16:
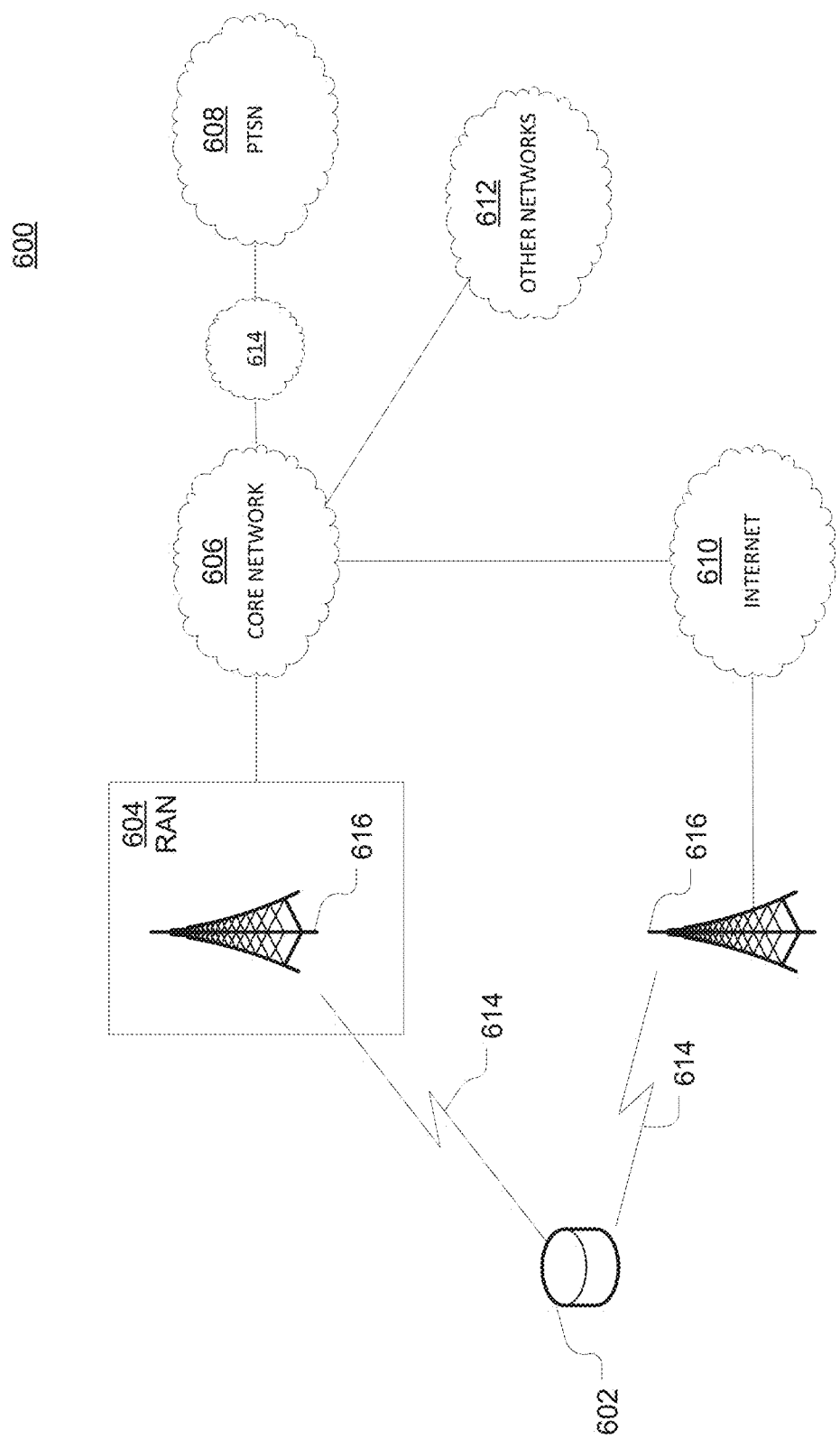
FIG. 16 illustrates a base station with a direct connection to Internet.

As shown in FIG. 16, telecommunication system 600 may include wireless transmit/receive units (WTRUs) 602, a Radio Access Network (RAN) 604, a core network 606, a public switched telephone network (PSTN) 608, the Internet 610, or other networks 612, though it will be appreciated that the disclosed examples contemplate any number of Wireless Transmit/Receive Units (WTRUs), base stations, networks, or network elements. Each WTRU 602 may be any type of device configured to operate or communicate in a wireless environment. For example, a WTRU may comprise a mobile device, network device or the like, or any combination thereof. By way of example, WTRUs 602 may be configured to transmit or receive wireless signals and may include a UE, a mobile station, a mobile device, a fixed or mobile subscriber unit, a pager, a cellular telephone, a PDA, a smartphone, a laptop, a netbook, a personal computer, a wireless sensor, consumer electronics, or the like. WTRUs 602 may be configured to transmit or receive wireless signals over an air interface 614.

Telecommunication system 600 may also include one or more base stations 616. Each of base stations 616 may be any type of device configured to wirelessly interface with at least one of the WTRUs 602 to facilitate access to one or more communication networks, such as core network 606, PTSN 608, Internet 610, or other networks 612. By way of example, base stations 616 may be a base transceiver station (BTS), a Node-B, an eNode B, a Home Node B, a Home eNode B, a site controller, an access point (AP), a wireless router, or the like. While base stations 616 are each depicted as a single element, it will be appreciated that base stations 616 may include any number of interconnected base stations or network elements.

RAN 604 may include one or more base stations 616, along with other network elements (not shown), such as a base station controller (BSC), a radio network controller (RNC), or relay nodes. One or more base stations 616 may be configured to transmit or receive wireless signals within a particular geographic region, which may be referred to as a cell (not shown). The cell may further be divided into cell sectors. For example, the cell associated with base station 616 may be divided into three sectors such that base station 616 may include three transceivers: one for each sector of the cell. In another example, base station 616 may employ multiple-input multiple-output (MIMO) technology and, therefore, may utilize multiple transceivers for each sector of the cell.

Base stations 616 may communicate with one or more of WTRUs 602 over air interface 614, which may be any suitable wireless communication link (e.g., radio frequency (RF), microwave, infrared (IR), ultraviolet (UV), or visible light). Air interface 614 may be established using any suitable radio access technology (RAT).

More specifically, as noted above, telecommunication system 600 may be a multiple access system and may employ one or more channel access schemes, such as Code Division Multiple Access (CDMA), Time-Division Multiple Access (TDMA), Frequency Division Multiple Access (FDMA), Orthogonal FDMA (OFDMA), Single-Carrier FDMA (SC-FDMA), or the like. For example, base station 616 in RAN 604 and WTRUs 602 connected to RAN 604 may implement a radio technology such as Universal Mobile Telecommunications System (UMTS) Terrestrial Radio Access (UTRA) that may establish air interface 614 using wideband CDMA (WCDMA). WCDMA may include communication protocols, such as High-Speed Packet Access (HSPA) or Evolved HSPA (HSPA+). HSPA may include High-Speed Downlink Packet Access (HSDPA) or High-Speed Uplink Packet Access (HSUPA).

As another example base station 616 and WTRUs 602 that are connected to RAN 604 may implement a radio technology such as Evolved UMTS Terrestrial Radio Access (E-UTRA), which may establish air interface 614 using LTE or LTE-Advanced (LTE-A).

Optionally base station 616 and WTRUs 602 connected to RAN 604 may implement radio technologies such as IEEE 802.16 (i.e., Worldwide Interoperability for Microwave Access (WiMAX)), CDMA2000, CDMA2000 1X, CDMA2000 Evolution-Data Optimized (EV-DO), Interim Standard 2000 (IS-2000), Interim Standard 95 (IS-95), Interim Standard 856 (IS-856), GSM, Enhanced Data rates for GSM Evolution (EDGE), Global System for Mobile Communication (GSM) EDGE (GERAN), or the like.

Base station 616 may be a wireless router, Home Node B, Home eNode B, or access point, for example, and may utilize any suitable RAT for facilitating wireless connectivity in a localized area, such as a place of business, a home, a vehicle, a campus, or the like. For example, base station 616 and associated WTRUs 602 may implement a radio technology such as IEEE 802.11 to establish a wireless local area network (WLAN). As another example, base station 616 and associated WTRUs 602 may implement a radio technology such as IEEE 802.15 to establish a wireless personal area network (WPAN). In yet another example, base station 616 and associated WTRUs 602 may utilize a cellular-based RAT (e.g., WCDMA, CDMA2000, GSM, LTE, LTE-A, etc.) to establish a picocell or femtocell. As shown in FIG. 16, base station 616 may have a direct connection to Internet 610. Thus, base station 616 may not be required to access Internet 610 via core network 606.

RAN 604 may be in communication with core network 606, which may be any type of network configured to provide voice, data, applications, and/or voice over internet protocol (VoIP) services to one or more WTRUs 602. For example, core network 606 may provide call control, billing services, mobile location-based services, pre-paid calling, Internet connectivity, video distribution or high-level security functions, such as user authentication. Although not shown in FIG. 16, it will be appreciated that RAN 604 or core network 606 may be in direct or indirect communication with other RANs that employ the same RAT as RAN 604 or a different RAT. For example, in addition to being connected to RAN 604, which may be utilizing an E-UTRA radio technology, core network 606 may also be in communication with another RAN (not shown) employing a GSM radio technology.

Core network 606 may also serve as a gateway for WTRUs 602 to access PSTN 608, Internet 610, or other networks 612. PSTN 608 may include circuit-switched telephone networks that provide plain old telephone service (POTS). For LTE core networks, core network 606 may use IMS core 606 to provide access to PSTN 608. Internet 610 may include a global system of interconnected computer networks or devices that use common communication protocols, such as the transmission control protocol (TCP), user datagram protocol (UDP), or Internet Protocol (IP) in the TCP/IP internet protocol suite. Other networks 612 may include wired or wireless communications networks owned or operated by other service providers. For example, other networks 612 may include another core network connected to one or more RANs, which may employ the same RAT as RAN 604 or a different RAT.

Some or all WTRUs 602 in telecommunication system 600 may include multi-mode capabilities. That is, WTRUs 602 may include multiple transceivers for communicating with different wireless networks over different wireless links. For example, one or more WTRUs 602 may be configured to communicate with base station 616, which may employ a cellular-based radio technology, and with base station 616, which may employ an IEEE 802 radio technology.

Figure 17:
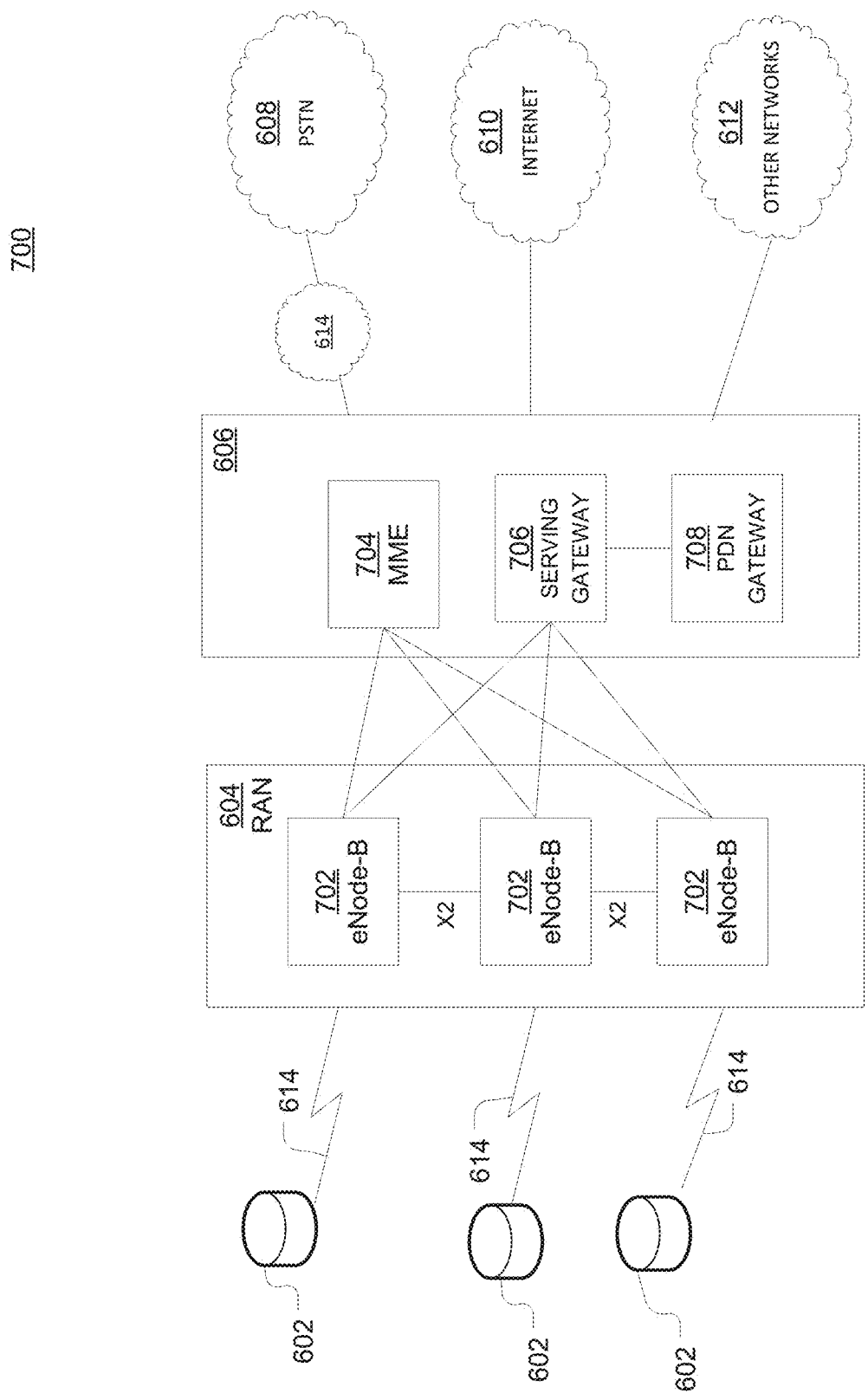
FIG. 17 is an example system including RAN and core network.

FIG. 17 is an example system 700 including RAN 604 and core network 606. As noted above, RAN 604 may employ an E-UTRA radio technology to communicate with WTRUs 602 over air interface 614. RAN 604 may also be in communication with core network 606.

RAN 604 may include any number of eNode-Bs 702 while remaining consistent with the disclosed technology. One or more eNode-Bs 702 may include one or more transceivers for communicating with the WTRUs 602 over air interface 614. Optionally, eNode-Bs 702 may implement MIMO technology. Thus, one of eNode-Bs 702, for example, may use multiple antennas to transmit wireless signals to, or receive wireless signals from, one of WTRUs 602.

Each of eNode-Bs 702 may be associated with a particular cell (not shown) and may be configured to handle radio resource management decisions, handover decisions, scheduling of users in the uplink or downlink, or the like. As shown in FIG. 17 eNode-Bs 702 may communicate with one another over an X2 interface.

Core network 606 shown in FIG. 17 may include a mobility management gateway or entity (MME) 704, a serving gateway 706, or a packet data network (PDN) gateway 708. While each of the foregoing elements are depicted as part of core network 606, it will be appreciated that any one of these elements may be owned or operated by an entity other than the core network operator.

MME 704 may be connected to each of eNode-Bs 702 in RAN 604 via an S1 interface and may serve as a control node. For example, MME 704 may be responsible for authenticating users of WTRUs 602, bearer activation or deactivation, selecting a particular serving gateway during an initial attach of WTRUs 602, or the like. MME 704 may also provide a control plane function for switching between RAN 604 and other RANs (not shown) that employ other radio technologies, such as GSM or Wideband CDMA (WCDMA).

Serving gateway 706 may be connected to each of eNode-Bs 702 in RAN 604 via the S1 interface. Serving gateway 706 may generally route or forward user data packets to or from the WTRUs 602. Serving gateway 706 may also perform other functions, such as anchoring user planes during inter-eNode B handovers, triggering paging when downlink data is available for WTRUs 602, managing or storing contexts of WTRUs 602, or the like.

Serving gateway 706 may also be connected to PDN gateway 708, which may provide WTRUs 602 with access to packet-switched networks, such as Internet 610, to facilitate communications between WTRUs 602 and IP-enabled devices.

Core network 606 may facilitate communications with other networks. For example, core network 606 may provide WTRUs 602 with access to circuit-switched networks, such as PSTN 608, such as through IMS core 606 to facilitate communications between WTRUs 602 and traditional landline communications devices. In addition, core network 606 may provide the WTRUs 602 with access to other networks 612, which may include other wired or wireless networks that are owned or operated by other service providers.

Figure 18:
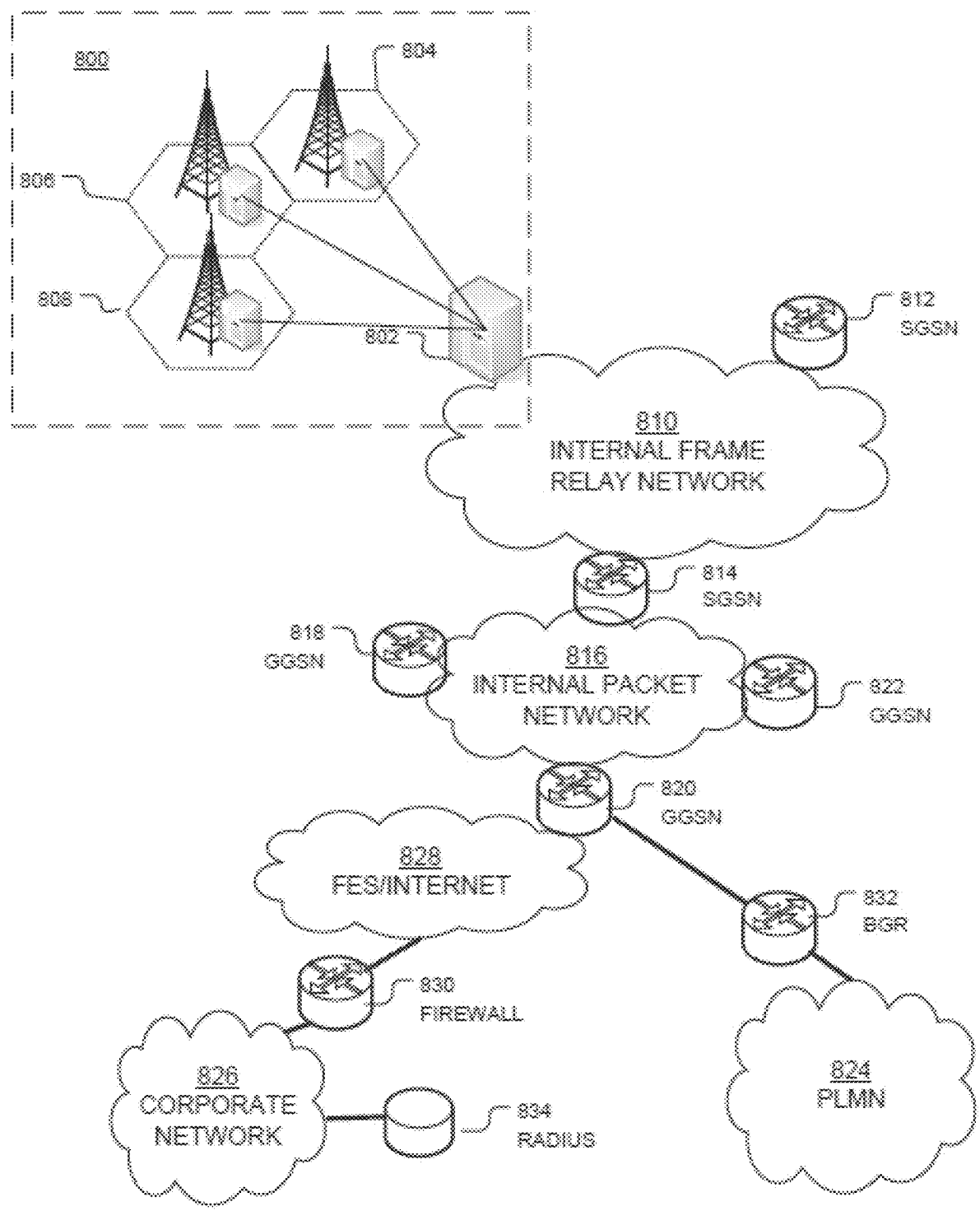
FIG. 18 illustrates an overall block diagram of an example packet-based mobile cellular network environment.

FIG. 18 depicts an overall block diagram of an example packet-based mobile cellular network environment, such as a GPRS network as described herein. In the example packet-based mobile cellular network environment shown in FIG. 18, there are a plurality of base station subsystems (BSS) 800 (only one is shown), each of which comprises a base station controller (BSC) 802 serving a plurality of Baseband Transceiver Stations (BTSs), such as BTSs 804, 806, 808. BTSs 804, 806, 808 are the access points where users of packet-based mobile devices become connected to the wireless network. In example fashion, the packet traffic originating from mobile devices is transported via an over-the-air interface to BTS 808, and from BTS 808 to BSC 802. Base station subsystems, such as BSS 800, are a part of internal frame relay network 810 that can include a Serving GPRS Support Node (SGSN), such as SGSN 812 or SGSN 814. Each SGSN 812, 814 is connected to an internal packet network 816 through which SGSN 812, 814 can route data packets to or from a plurality of gateway GPRS support nodes (GGSN) 818, 820, 822. As illustrated, SGSN 814 and GGSNs 818, 820, 822 are part of internal packet network 816. GGSNs 818, 820, 822 mainly provide an interface to external IP networks such as Public Land Mobile Network (PLMN) 824, corporate intranets/internets 826, or Fixed-End System (FES) or the public Internet 828. As illustrated, subscriber corporate network 826 may be connected to GGSN 820 via a firewall 830. PLMN 824 may be connected to GGSN 820 via a border gateway router (BGR) 832. A Remote Authentication Dial-In User Service (RADIUS) server 834 may be used for caller authentication when a user calls corporate network 826.

Generally, there may be a several cell sizes in a network, referred to as macro, micro, pico, femto or umbrella cells. The coverage area of each cell is different in different environments. Macro cells can be regarded as cells in which the base station antenna is installed in a mast or a building above average roof top level. Micro cells are cells whose antenna height is under average roof top level. Micro cells are typically used in urban areas. Pico cells are small cells having a diameter of a few dozen meters. Pico cells are used mainly indoors. Femto cells have the same size as pico cells, but a smaller transport capacity. Femto cells are used indoors, in residential or small business environments. On the other hand, umbrella cells are used to cover shadowed regions of smaller cells and fill in gaps in coverage between those cells.

Figure 19:
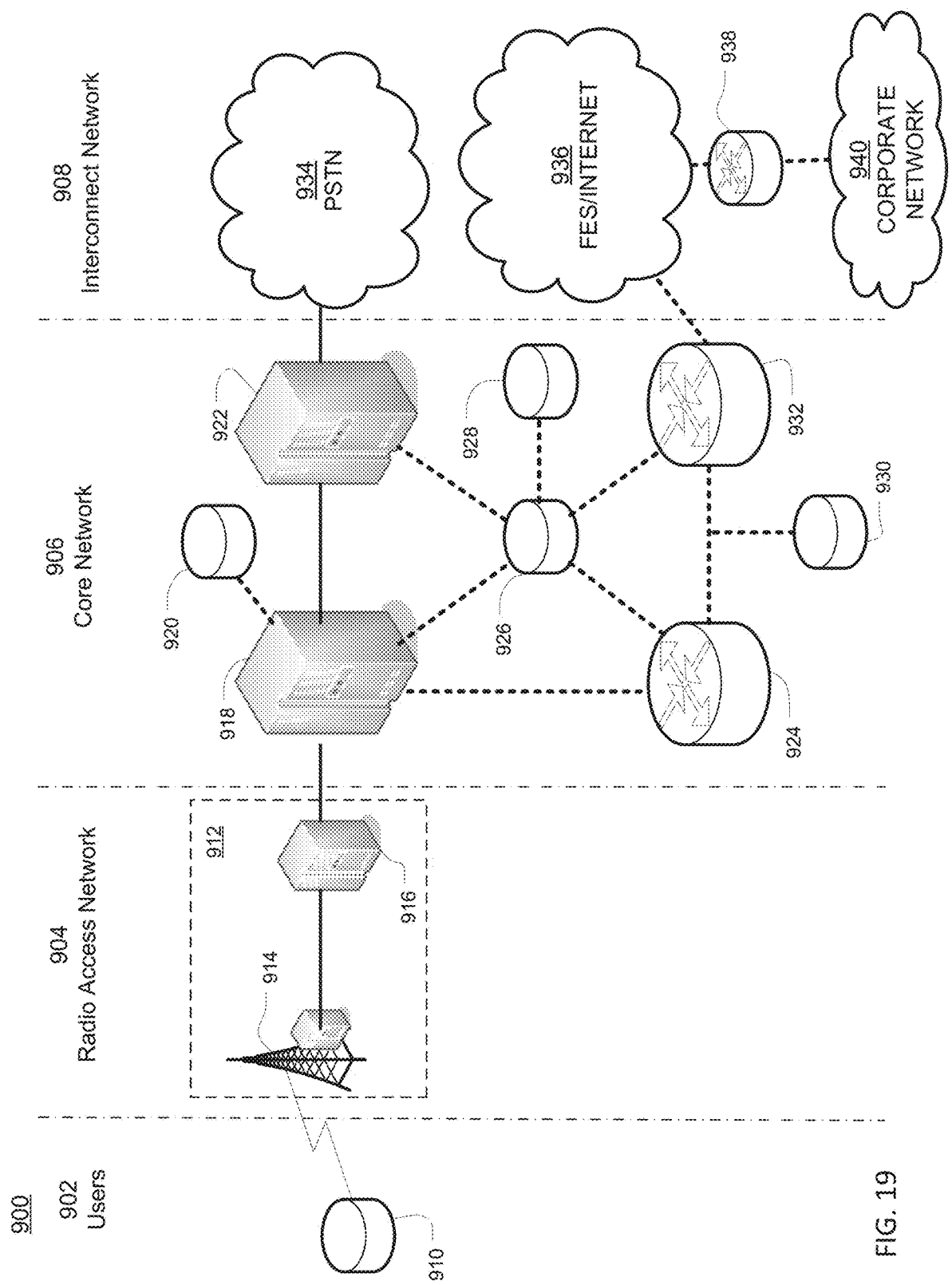
FIG. 19 illustrates an architecture of a typical General Packet Radio Service (GPRS) network.

FIG. 19 illustrates an architecture of a typical GPRS network 900 as described herein. The architecture depicted in FIG. 19 may be segmented into four groups: users 902, RAN 904, core network 906, and interconnect network 908. Users 902 comprise a plurality of end users, who each may use one or more devices 910. Note that device 910 is referred to as a mobile subscriber (MS) in the description of network shown in FIG. 19. In an example, device 910 comprises a communications device (e.g., mobile device 102, mobile positioning center 116, network device 300, any of detected devices 500, second device 508, access device 604, access device 606, access device 608, access device 610 or the like, or any combination thereof). Radio access network 904 comprises a plurality of BSSs such as BSS 912, which includes a BTS 914 and a BSC 916. Core network 906 may include a host of various network elements. As illustrated in FIG. 19, core network 906 may comprise MSC 918, service control point (SCP) 920, gateway MSC (GMSC) 922, SGSN 924, home location register (HLR) 926, authentication center (AuC) 928, domain name system (DNS) server 930, and GGSN 932. Interconnect network 908 may also comprise a host of various networks or other network elements. As illustrated in FIG. 19, interconnect network 908 comprises a PSTN 934, an FES/Internet 936, firewall 938, or a corporate network 940.

An MSC can be connected to a large number of BSCs. At MSC 918, for instance, depending on the type of traffic, the traffic may be separated in that voice may be sent to PSTN 934 through GMSC 922, or data may be sent to SGSN 924, which then sends the data traffic to GGSN 932 for further forwarding.

When MSC 918 receives call traffic, for example, from BSC 916, it sends a query to a database hosted by SCP 920, which processes the request and issues a response to MSC 918 so that it may continue call processing as appropriate.

Home Location Register (HLR) 926 is a centralized database for users to register to the GPRS network. HLR 926 stores static information about the subscribers such as the International Mobile Subscriber Identity (IMSI), subscribed services, or a key for authenticating the subscriber. HLR 926 also stores dynamic subscriber information such as the current location of the MS. Associated with HLR 926 is AuC 928, which is a database that contains the algorithms for authenticating subscribers and includes the associated keys for encryption to safeguard the user input for authentication.

In the following, depending on context, "mobile subscriber" or "MS" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 19, when MS 910 initiates the attach process by turning on the network capabilities of the mobile device, an attach request is sent by MS 910 to SGSN 924. The SGSN 924 queries another SGSN, to which MS 910 was attached before, for the identity of MS 910. Upon receiving the identity of MS 910 from the other SGSN, SGSN 924 requests more information from MS 910. This information is used to authenticate MS 910 together with the information provided by HLR 926. Once verified, SGSN 924 sends a location update to HLR 926 indicating the change of location to a new SGSN, in this case SGSN 924. HLR 926 notifies the old SGSN, to which MS 910 was attached before, to cancel the location process for MS 910. HLR 926 then notifies SGSN 924 that the location update has been performed. At this time, SGSN 924 sends an Attach Accept message to MS 910, which in turn sends an Attach Complete message to SGSN 924.

Next, MS 910 establishes a user session with the destination network, corporate network 940, by going through a Packet Data Protocol (PDP) activation process. Briefly, in the process, MS 910 requests access to the Access Point Name (APN), for example, UPS.com, and SGSN 924 receives the activation request from MS 910. SGSN 924 then initiates a DNS query to learn which GGSN 932 has access to the UPS.com APN. The DNS query is sent to a DNS server within core network 906, such as DNS server 930, which is provisioned to map to one or more GGSNs in core network 906. Based on the APN, the mapped GGSN 932 can access requested corporate network 940. SGSN 924 then sends to GGSN 932 a Create PDP Context Request message that contains necessary information. GGSN 932 sends a Create PDP Context Response message to SGSN 924, which then sends an Activate PDP Context Accept message to MS 910.

Once activated, data packets of the call made by MS 910 can then go through RAN 904, core network 906, and interconnect network 908, in a particular FES/Internet 936 and firewall 938, to reach corporate network 940.

Figure 20:
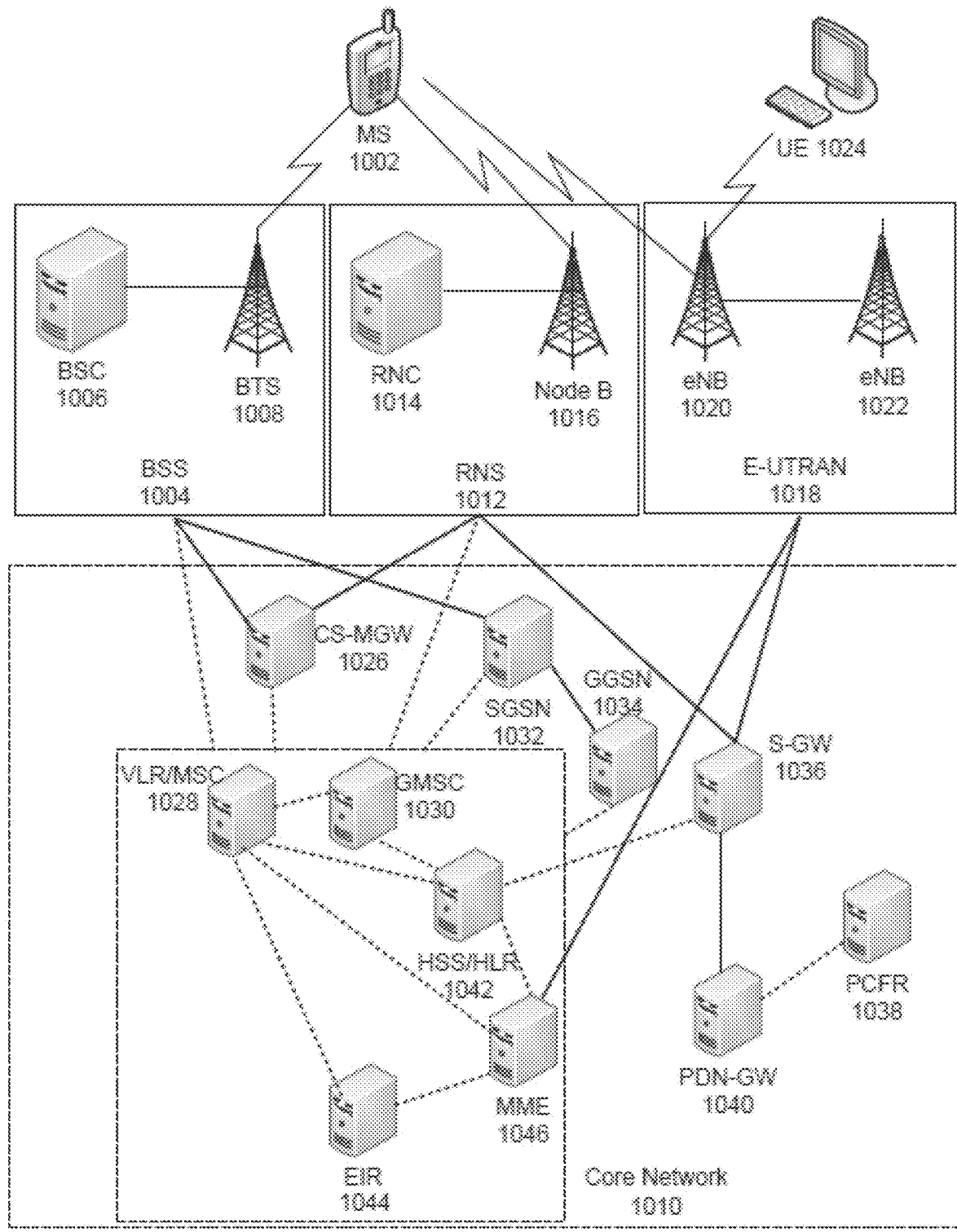
FIG. 20 illustrates a Public Land Mobile Network (PLMN) block diagram view of an example architecture that may be replaced by a telecommunications system.

FIG. 20 illustrates a PLMN block diagram view of an example architecture that may be replaced by a telecommunications system. In FIG. 20, solid lines may represent user traffic signals, and dashed lines may represent support signaling. MS 1002 is the physical equipment used by the PLMN subscriber. For example, network device or the like may serve as MS 1002. MS 1002 may be one of, but not limited to, a cellular telephone, a cellular telephone in combination with another electronic device or any other wireless mobile communication device.

MS 1002 may communicate wirelessly with BSS 1004. BSS 1004 contains BSC 1006 and a BTS 1008. BSS 1004 may include a single BSC 1006/BTS 1008 pair (base station) or a system of BSC/BTS pairs that are part of a larger network. BSS 1004 is responsible for communicating with MS 1002 and may support one or more cells. BSS 1004 is responsible for handling cellular traffic and signaling between MS 1002 and a core network 1010. Typically, BSS 1004 performs functions that include, but are not limited to, digital conversion of speech channels, allocation of channels to mobile devices, paging, or transmission/reception of cellular signals.

Additionally, MS 1002 may communicate wirelessly with RNS 1012. RNS 1012 contains a Radio Network Controller (RNC) 1014 and one or more Nodes B 1016. RNS 1012 may support one or more cells. RNS 1012 may also include one or more RNC 1014/Node B 1016 pairs or alternatively a single RNC 1014 may manage multiple Nodes B 1016. RNS 1012 is responsible for communicating with MS 1002 in its geographically defined area. RNC 1014 is responsible for controlling Nodes B 1016 that are connected to it and is a control element in a UMTS radio access network. RNC 1014 performs functions such as, but not limited to, load control, packet scheduling, handover control, security functions, or controlling MS 1002 access to core network 1010.

An E-UTRA Network (E-UTRAN) 1018 is a RAN that provides wireless data communications for MS 1002 and UE 1024. E-UTRAN 1018 provides higher data rates than traditional UMTS. It is part of the LTE upgrade for mobile networks, and later releases meet the requirements of the International Mobile Telecommunications (IMT) Advanced and are commonly known as a 4G networks. E-UTRAN 1018 may include of series of logical network components such as E-UTRAN Node B (eNB) 1020 and E-UTRAN Node B (eNB) 1022. E-UTRAN 1018 may contain one or more eNBs. User equipment (UE) 1024 may be any mobile device capable of connecting to E-UTRAN 1018 including, but not limited to, a personal computer, laptop, mobile device, wireless router, or other device capable of wireless connectivity to E-UTRAN 1018. The improved performance of the E-UTRAN 1018 relative to a typical UMTS network allows for increased bandwidth, spectral efficiency, and functionality including, but not limited to, voice, high-speed applications, large data transfer or IPTV, while still allowing for full mobility.

Typically MS 1002 may communicate with any or all of BSS 1004, RNS 1012, or E-UTRAN 1018. In an illustrative system, each of BSS 1004, RNS 1012, and E-UTRAN 1018 may provide MS 1002 with access to core network 1010. Core network 1010 may include of a series of devices that route data and communications between end users. Core network 1010 may provide network service functions to users in the circuit switched (CS) domain or the packet switched (PS) domain. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The circuit-switched Media Gateway (MGW) function (CS-MGW) 1026 is part of core network 1010, and interacts with VLR/MSC server 1028 and GMSC server 1030 in order to facilitate core network 1010 resource control in the CS domain. Functions of CS-MGW 1026 include, but are not limited to, media conversion, bearer control, payload processing or other mobile network processing such as handover or anchoring. CS-MGW 1026 may receive connections to MS 1002 through BSS 1004 or RNS 1012.

SGSN 1032 stores subscriber data regarding MS 1002 in order to facilitate network functionality. SGSN 1032 may store subscription information such as, but not limited to, the IMSI, temporary identities, or PDP addresses. SGSN 1032 may also store location information such as, but not limited to, GGSN address for each GGSN 1034 where an active PDP exists. GGSN 1034 may implement a location register function to store subscriber data it receives from SGSN 1032 such as subscription or location information.

Serving gateway (S-GW) 1036 is an interface which provides connectivity between E-UTRAN 1018 and core network 1010. Functions of S-GW 1036 include, but are not limited to, packet routing, packet forwarding, transport level packet processing, or user plane mobility anchoring for inter-network mobility. PCRF 1038 uses information gathered from P-GW 1036, as well as other sources, to make applicable policy and charging decisions related to data flows, network resources or other network administration functions. PDN gateway (PDN-GW) 1040 may provide user-to-services connectivity functionality including, but not limited to, GPRS/EPC network anchoring, bearer session anchoring and control, or IP address allocation for PS domain connections.

HSS/HLR 1042 is a database for user information and stores subscription data regarding MS 1002 or UE 1024 for handling calls or data sessions. Networks may contain one HSS/HLR 1042 or more if additional resources are required. Example data stored by HSS 1042 include, but is not limited to, user identification, numbering or addressing information, security information, or location information. HSS/HLR 1042 may also provide call or session establishment procedures in both the PS and CS domains.

VLR/MSC Server 1028 provides user location functionality. When MS 1002 enters a new network location, it begins a registration procedure. A MSC server for that location transfers the location information to the VLR for the area. A VLR and MSC server may be located in the same computing environment, as is shown by VLR/MSC server 1028, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for MS 1002 registration or procedures for handover of MS 1002 to a different section of core network 1010. Gateway Mobile Services Switching Center (GMSC) server 1030 may serve as a connection to alternate GMSC servers for other MSs in larger networks.

Equipment Identity Register (EIR) 1044 is a logical element which may store the IMEI for MS 1002. User equipment may be classified as either "white listed" or "black listed" depending on its status in the network. If MS 1002 is stolen and put to use by an unauthorized user, it may be registered as "black listed" in EIR 1044, preventing its use on the network. A MME 1046 is a control node which may track MS 1002 or UE 1024 if the devices are idle. Additional functionality may include the ability of MME 1046 to contact idle MS 1002 or UE 1024 if retransmission of a previous session is required.

As described herein, a telecommunications system wherein management and control utilizing a software designed network (SDN) and an internet protocol are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple Machine-to-Machine (M2M) and Internet of Things (IoT) sensors/devices—through enhanced wireless management.

While examples of a telecommunications system in which communications can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, Compact Disc-Read-Only Memory devices (CD-ROMs), Digital Versatile Discs, or, Digital Video Discs (DVDs), hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, over the air (OTA), or firmware over the air (FOTA), wherein, when the program code is received and loaded into and executed by a machine, such as an Erasable Programmable Read-Only Memory (EPROM), a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

It will be apparent to those skilled in the art that various modifications and variations may be made in the present disclosure without departing from the scope or spirit of the disclosure. Other aspects of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system for providing network function as a service, comprising:
   a combination of virtual network resources hosted on physical network resources, wherein the virtual network resources are dynamically configurable to provide a set of processing resources in a virtual network; and
   a configurable controller in communication with the combination of virtual network resources, wherein the configurable controller includes a scheduler and load balancer and wherein the configurable controller comprises:
   a processing system including a processor; and
   a memory that stores executable instructions that, when executed by the processing system, facilitate performance of operations, comprising:
   receiving a request to provide a network function as a service functionality from an access node;
   retrieving policies associated with the request;
   creating a plurality of pods, wherein a first pod of the plurality of pods is configured to schedule a first virtual function among the virtual network resources to be assigned to one or more physical resources based on the polices, and wherein a second pod of the plurality of pods is configured to schedule a second virtual function among the virtual network resources to be assigned to the one or more physical resources based on the policies;
   instantiating the first virtual function under the control of the first pod and a passive copy of the first virtual function under control of the first pod;
   instantiating the second virtual function under control of the second pod;
   executing a control loop, wherein the control loop is configured to detect an abnormality in the virtual network;
   responsive to the control loop not detecting the abnormality in the virtual network, continuing processing via the first virtual function;
   responsive to the control loop detecting the abnormality in the virtual network, transitioning processing from the first virtual function to the passive copy of the first virtual function; and
   balancing the first virtual function and the second virtual function across the one or more physical resources and in view of the executing of the control loop.

2. The system of claim 1 wherein the operations further include monitoring the first virtual function and the second virtual function and adjusting a load balance based on the monitoring.

3. The system of claim 2 wherein the first virtual function is configured to communicate with a first plurality of mobile devices and the second virtual function is configured to communicate with a second plurality of mobile devices.

4. The system of claim 3 wherein the first plurality of mobile devices are configured to a first fully qualified domain name and the second plurality of mobile devices are configured to a second fully qualified domain name.

5. The system of claim 3 wherein the first plurality of mobile devices are configured to a first fixed Internet Protocol (IP) address and the second plurality of mobile devices are configured to a second fixed IP address.

6. The system of claim 5 wherein the first fixed IP address is associated with a physical resource or a virtual resource.

7. The system of claim 3 further comprising a third virtual function under the control of a third pod of the plurality of pods, and wherein the scheduler assigns the first virtual function, the second virtual function and the third virtual function to a plurality of physical network resources using a weighted round robin method.

8. The system of claim 7 wherein one of the plurality of physical network resources is taken off line and the first virtual function, the second virtual function and the third virtual function are dynamically reassigned by the load balancer to the plurality of physical network resources that are remaining on line.

9. The system of claim 7 wherein one of the plurality of physical network resources experiences a higher load independent of the request and the load balancer reassigns a virtual function assigned to the one of the plurality of physical network resources to a second of the plurality of physical network resources.

10. The system of claim 1 wherein a second request for network function as a service functionality is received from a second access node and the scheduler and the load balancer dynamically assign one or more pods of the plurality of pods to instantiate one or more virtual functions to form a second set of virtual network resources to the plurality of physical network resources to support the second request in accordance with the policies, wherein the one or more pods includes the first pod if the first virtual function is needed to support the second request and the second pod if the second virtual function is needed to support the second request.

11. The system of claim 10 wherein the request and the second request are among a plurality of requests and the plurality of requests are dynamically accommodated on demand.

12. The system of claim 1 wherein the request is supported based on a per-use model.

13. A method comprising:
- establishing, by a processing system including a processor, multi-level policies for providing network functions as a service in a virtual network;
- receiving, by the processing system, at a top level a request to provide network functions as a service from an access node;
- determining, by the processing system, an initial set of resources to satisfy the request;
- determining, by the processing system, an initial load balance among the initial set of resources in accordance with the multi-level policies;
- assigning, by the processing system, a first virtual function under control of a first pod at a second level to a first set of the initial set of resources;
- instantiating, by the processing system, the first virtual function and a passive copy of the first virtual function under control of the first pod;
- assigning, by the processing system, a second virtual function under control of a second pod at a second level to a second set of the initial set of resources;
- instantiating, by the processing system, the second virtual function;
- monitoring, by the processing system, the first virtual function and the second virtual function to detect an abnormality in the virtual network;
- responsive to the monitoring not detecting the abnormality in the virtual network, continuing processing via the first virtual function;
- responsive to the monitoring detecting the abnormality in the virtual network, transitioning processing of the first virtual function to the passive copy of the first virtual function; and
- adjusting, by the processing system, the initial load balance based on the monitoring.

14. The method of claim 13 wherein the policies are determined at the virtual function, the network function, a site or a service level to support network function as a service requests.

15. The method of claim 13 wherein the policies include allocation and load balancing that include redundancy of virtual functions on one physical set of resources or spread across multiple sets of physical resources.

16. The method of claim 13 wherein the policies include assigning virtual functions to physical resources based on geo-proximity or weighted round robin assignments.

17. The method of claim 16 wherein weights used in the weighted round robin assignments are dynamically changed to create a second set of weights based on the monitoring and the adjusting is based on the second set of weights.

18. The method of claim 13 wherein a second request to provide network function as a service is received and a second set of virtual resources are identified to support the second request and wherein the initial load balance is dynamically adjusted to accommodate the second set of virtual resources.

19. The method of claim 18 wherein the load balance is determined based on the policies.

20. A non-transitory computer readable storage medium storing computer executable instructions that when executed by a processing system including a processor cause the processing system to perform operations comprising:
- establishing multi-level policies for providing network functions as a service in a virtual network;
- receiving at a top level a request to provide network functions as a service from an access node;
- determining an initial set of resources to satisfy the request;
- determining an initial load balance among the initial set of resources in accordance with the multi-level policies;
- assigning a first virtual function under control of a first pod at a second level to a first set of the initial set of resources;
- instantiating the first virtual function and a passive copy of the first virtual function under control of the first pod;
- assigning a second virtual function under control of a second pod at a second level to a second set of the initial set of resources;
- instantiating the second virtual function;
- monitoring the first virtual function and the second virtual function to detect an abnormality in the virtual network;
- responsive to the monitoring not detecting the abnormality in the virtual network, continuing processing via the first virtual function;
- responsive to the monitoring detecting the abnormality in the virtual network, transitioning processing of the first virtual function to the passive copy of the first virtual function; and
- adjusting the initial load balance based on the monitoring.

* * * * *